(12) United States Patent
Laverack et al.

(10) Patent No.: US 6,681,971 B2
(45) Date of Patent: Jan. 27, 2004

(54) VARIABLY CONFIGURABLE SECUREMENT ARRANGEMENT IN A LOAD CARRIER

(75) Inventors: John Laverack, Southbury, CT (US); Gregor Weaver, Danbury, CT (US); John F. Niedermeyer, Woodbury, CT (US); Fred Murray, Southington, CT (US); Jeffrey Ransden, Fairfield, CT (US)

(73) Assignee: Thule Sweden AB, Hillerstorp (SE)

( * ) Notice: Subject to any disclaimer, the term of this patent is extended or adjusted under 35 U.S.C. 154(b) by 138 days.

(21) Appl. No.: 10/094,420

(22) Filed: Mar. 8, 2002

(65) Prior Publication Data
US 2002/0125282 A1 Sep. 12, 2002

Related U.S. Application Data
(60) Provisional application No. 60/274,171, filed on Mar. 8, 2001.

(51) Int. Cl.[7] ................................................. B60R 9/00
(52) U.S. Cl. ................ 224/319; 224/321; 224/325; 224/546; 224/547; 224/558; 224/570; 24/489; 24/517
(58) Field of Search .................. 224/317, 319, 224/321, 323, 325, 546, 547, 548, 558, 570; 248/316.5; 24/489, 517

(56) References Cited

U.S. PATENT DOCUMENTS

| | | | | |
|---|---|---|---|---|
| 2,995,332 A | * | 8/1961 | Davis | 248/229.13 |
| 4,301,982 A | * | 11/1981 | Tiemann | 244/17.11 |
| 4,445,657 A | * | 5/1984 | Breckenridge | 248/73 |
| 5,419,479 A | * | 5/1995 | Evels et al. | 224/321 |
| 5,492,258 A | * | 2/1996 | Brunner | 224/321 |
| 5,556,221 A | * | 9/1996 | Brunner | 403/322.4 |
| 5,730,343 A | * | 3/1998 | Settelmayer | 224/321 |
| 5,758,810 A | * | 6/1998 | Stapleton | 224/321 |
| 5,779,119 A | * | 7/1998 | Talbot et al. | 224/427 |
| 6,164,507 A | * | 12/2000 | Dean et al. | 224/324 |
| 6,439,526 B1 | * | 8/2002 | London | 248/316.5 |

* cited by examiner

Primary Examiner—Stephen K. Cronin
(74) Attorney, Agent, or Firm—Howrey Simon Arnold & White LLP

(57) ABSTRACT

Securement arrangement for mounting articles upon a carrying vehicle. The arrangement includes a pair of substantially rigid body members. At least one of the pair of body members has a receiver configured to accept the installation of a fitting member therein. A plurality of resilient fitting members are utilized. Each fitting member is adapted to be installed in the receiver in a plurality of orientations. At least one of the fitting members is configured to present a variable buffering thickness between the rigid body member and a receiving member of a carrying vehicle upon which the securement arrangement shall be installed. The variable buffering thickness is dependent upon an installed orientation of the fitting member in the receiver.

6 Claims, 21 Drawing Sheets

VARIABLY CONFIGURABLE SECUREMENT ARRANGEMENT IN A LOAD CARRIER

PRIORITY

This application claims priority to and hereby expressly incorporates, in its entirety, U.S. Provisional Application No. 60/274,171 filed Mar. 8, 2001.

TECHNICAL FIELD

The present invention relates generally to load carriers, and more specifically to securement arrangements for mounting a load carrier to a transporting vehicle.

BACKGROUND ART

As may be appreciated from the Figures, vehicles are often provided with rack assemblies, often at their rooftops, that are configured to accept the attachment of load carriers. In conventional configurations, a roof-top rack assembly typically has rails that run in a longitudinal direction of the vehicle with cross bar(s) or member(s) connected therebetween. The rails are normally the components of the rack system that actually attach to the vehicle; the load carrier may be connected directly to the rails or to the cross bar(s). Across different vehicles, the rails and cross members are usually of different configurations. More recently, however, and especially with respect to the rail members, the variance in design amongst different make/model vehicles has become even greater. This is found to be especially true in sport utility type vehicles where the rack has actually become a styling component and often an important component of the visual impression made upon the consumer. In an effort to make the rack systems present an athletic or sportsmen-type impression, the construction of the rails on certain sport utility vehicles is from tubulars (typically chrome or brushed aluminum) of such substantial size that they cannot be readily mounted upon using conventional securement arrangements of known load carrier assemblies.

In another aspect, the rack systems of many automobiles are different from one another, and even when similarly configured, the several racks of a particular configuration may be of differing sizes based on vehicle dimensions or other criteria established by the automobile manufacturer. As a result, load carrier manufacturers have had to produce a wide array of connectors in order to accommodate these different rail and cross bar configurations. This means that not only the manufacturer of the load carriers must produce many similar, but slightly customized connectors, but distributors and retailers must also stock a similarly wide array of product merely to accommodate the different vehicle rack systems which customers may desire to outfit with a load carrier. The necessity of providing such an array of mountings causes higher manufacturing costs and stocking costs, as well as a host of precipitated incidental costs and inconveniences.

In view of the above described deficiencies associated with the design of known load carrier-to-rack connectors, the present invention has been developed.

DISCLOSURE OF THE INVENTION

The present invention in its several disclosed embodiments alleviates the drawbacks described above with respect to conventionally designed load carrier-to-rack connectors or mountings, and incorporates several additionally beneficial features.

In at least one embodiment, the invention takes the form of a securement arrangement for mounting articles upon a carrying vehicle. The arrangement includes a substantially rigid body member having a receiver configured to accept the installation of a fitting member therein. A resilient fitting member is adapted to be installed in the receiver in a plurality of orientations and is configured to present a variable buffering thickness between the rigid body member and a receiving member of a carrying vehicle upon which the securement arrangement shall be installed. The variable buffering thickness is dependent upon an installed orientation of the fitting member in the receiver.

In an alternative embodiment, the invention takes the form of a securement arrangement for mounting articles upon a carrying vehicle. The arrangement includes a pair of substantially rigid body members. At least one of the pair of body members has a receiver configured to accept the installation of a fitting member therein. A resilient fitting member is adapted to be installed in the receiver in a plurality of orientations and is configured to present a variable buffering thickness between the rigid body member and a receiving member of a carrying vehicle upon which the securement arrangement shall be installed. The variable buffering thickness is dependent upon an installed orientation of the fitting member in the receiver.

The pair of substantially rigid body members are coupled together at a hinge connection configured to permit relative pivotal movement between the two body members of the pair.

In a preferred version of that which is described above, a plurality of resilient fitting members are utilized. Each fitting member is adapted to be installed in the receiver in a plurality of orientations. At least one of the fitting members is configured to present a variable buffering thickness between the rigid body member and a receiving member of a carrying vehicle upon which the securement arrangement shall be installed. The variable buffering thickness is dependent upon an installed orientation of the fitting member in the receiver.

At least one of the plurality of resilient fitting members has an adapted surface on at least one side thereof, the adapted surface is configured to cause a reduced buffering thickness to be established between the rigid body member and a receiving member of a carrying vehicle upon which the securement arrangement shall be installed based on the orientation of the adapted surface when the fitting member is installed in the rigid body member.

At least one of the plurality of resilient fitting members has a recess in at least one side thereof. The recess is configured to cause a reduced buffering thickness to be established between the rigid body member and a receiving member of a carrying vehicle upon which the securement arrangement shall be installed when the fitting member is installed with the recess toward the rigid body member.

The beneficial effects described above apply generally to the exemplary systems and components of a load carrier connector. The specific structures through which these benefits are delivered will be described in detail hereinbelow.

BRIEF DESCRIPTION OF THE DRAWINGS:

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
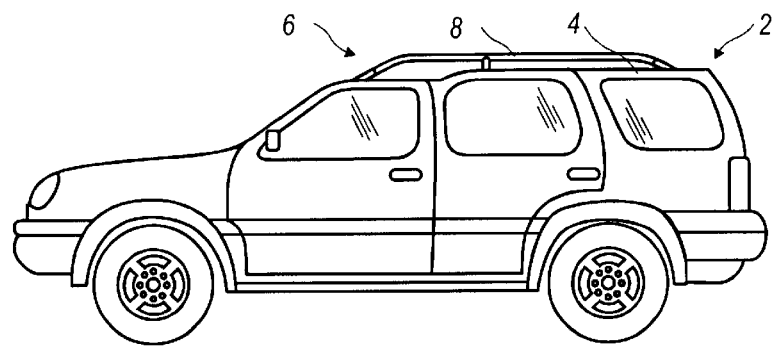
FIG. 1 is a side view of a sport utility vehicle having a rooftop rack assembly configured for connectively receiving a rooftop load carrier.
Figure 2:
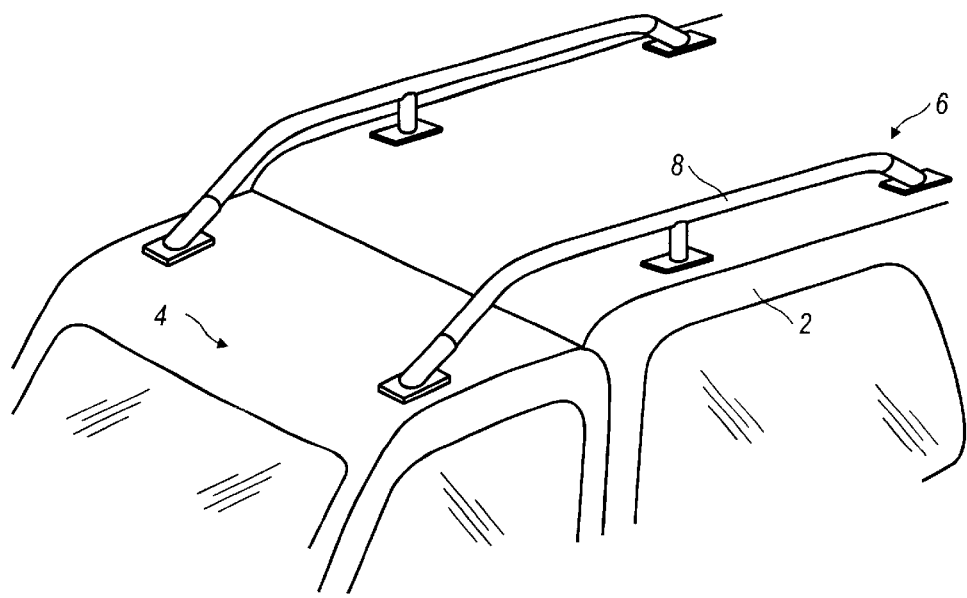
FIG. 2 is a detailed perspective view of a longitudinal side rail typical of a sport utility vehicle and as illustrated in FIG. 1.

Referring to FIG. 1 a transporting vehicle is illustrated. More specifically, a sport utility-style vehicle 2 having a carrier rack system 6 provided at its rooftop 4. FIG. 2 is a more detailed illustration of the rack system 6 showing a relatively large tubular side rail 8 that is connected to the rooftop 4 of the vehicle 2.

Figure 3:
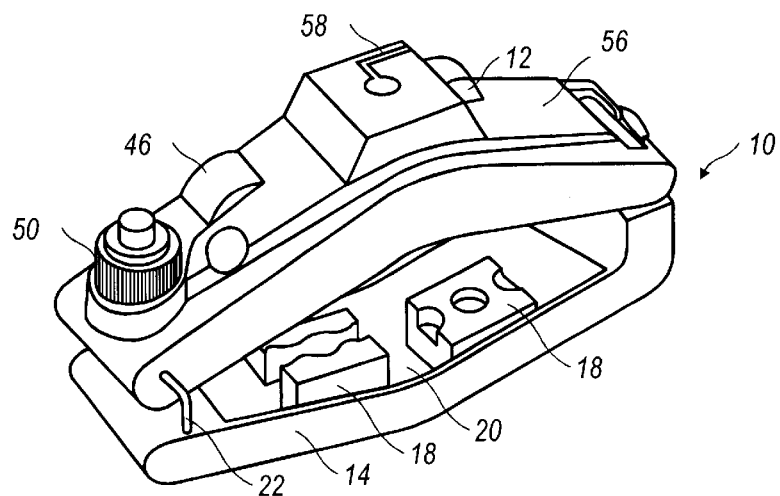
FIG. 3 is a perspective view of a preferred embodiment of a securement arrangement configured according to the present invention.

Referring to FIG. 3, a perspective view of a preferred embodiment of a securement arrangement 10 according to the present invention is illustrated. The securement arrangement 10 typically serves as a connector between a load carrier assembly, such as those configured for carrying cargo and those configured to carry sports equipment such as bicycles and skis. The roof rack system is typically more or less permanently mounted to the transporting vehicle.

As may be appreciated from the embodiment of FIGS. 3 and 4, the securement arrangement is of a clamshell-type, with a pair of substantially rigid body members. An upper body member 12 and a lower body member 14 are pivotally connected together by a hinge arrangement 16. As discussed hereinabove, the rails and cross members upon which the securement arrangement(s) must be attached often differ with respect to shape, size and orientation. For this reason, the present invention provides accommodating features for variably configuring the securement arrangement to fit about, and be secured to these differently configured vehicle components.

A primary means by which such an accommodation is accomplished entails the utilization of one or more resilient fitting members 18. In the preferred embodiment, the fitting members 18 are made of rubber. As may be appreciated in FIG. 3, a cavity 20 is provided within the lower body member 14 for receiving two fitting members. In a complementary sense, two additional fitting members are provided in a similar cavity in the upper body member 12 so that a rail or cross bar confining spacing is defined between the four fitting members.

The cavity in the body member(s) is configured as a receiver for the fitting member(s) 18. The interior space of the receiver may be adapted to establish discreet location of the several fitting members installed therein. Alternatively, the cavity may be of uniform configuration thereby permitting the fitting members to be continuously and variably positioned in the receiving space. Through the several different configurations of FIGS. 4(a)–(f), it is shown how four fitting members can be variously utilized to establish differently sized and shaped receiving areas within the securement arrangement.

Referring again to FIG. 3, however, it may be appreciated that the configuration of different surfaces on the fitting member 18 can be utilized to establish the thickness or distance that the fitting member 18 maintains between the body member 12, 14 in which it is received and the rack member it is intended to engage. The versatility and variability in configuring the fitting members 18 in the securement arrangement 10 is enhanced by the generally V-shape of the body members which produces an inclined configuration for the interior receiving spaces where the fitting members are seated. This inclined configuration enhances the variability of the effective buffering thickness of the fitting members, depending upon the members' relative position along the inclined portion of the body member. Furthermore, the fitting members themselves may be wedge-shaped for added variability or accentuation in this regard.

An important feature of the fitting member 18 is its buffering characteristic for protecting the member upon which the securement arrangement is mounted or engaged. Oftentimes, the cross bars and rails of a rack system are painted or otherwise coated and are therefore susceptible to mars and scratches that these buffers avoid.

The resilient nature of the fitting member(s) 18 infuse a certain degree of "give" in the connection and enables a more secure pressing engagement of the securement arrangement about the rail or cross bar. The resiliency in the typically rubber fitting members also serves a take-up function should there be any relaxation in the attachment of the securement arrangement about the cross bar or rail. Still further, the rubber material of construction delivers a high friction coefficient at the pressed engagement of the fitting member upon the rail or cross member.

In FIG. 3, the left-hand fitting member in the lower body member shows a recess 22 in its upper surface. This recess is designed to mate with an engaging rib on the lower surface of the receiving space in the lower body member. When this recess is face-down, mating engagement of the recess over the rib causes the fitting member 18 to project a relatively short distance above the upper perimeter of the lower body member 14 as characterized by the fitting member on the right. In contrast, when positioned as shown on the left in FIG. 3, the left-hand fitting member projects further above the top perimeter of the lower body member 14 because a non-recessed surface, as depicted on the top of the right hand fitting member, is downwardly facing for abutting engagement with the provided rib.

Because the receiver or cavity within the body member presents an elongate channel, sliding reciprocation within the channel can be permitted. At times this may be a desirable feature, however, at other times it is desirably avoided. Longitudinal fixing of the fitting members 18 in the cavity may be accomplished utilizing projecting posts off of the body member when engaged in mating receivers on the fitting members. This configuration is best appreciated with respect to the top surface of the right-hand fitting member a shown in the lower body member 14 of FIG. 3. It is by these possible variable arrangements that the several configurations of FIGS. 4(a) through 4(f) are established. As shown in the several permutations of FIG. 4, relative positions of the fitting members 18 may be prescribed at any point along the receiving body member by locating an upwardly projecting post for insertion into a receiving aperture such as that shown in the top surface of the right hand fitting member of FIG. 3.

Figures 4A, 4B, 4C:
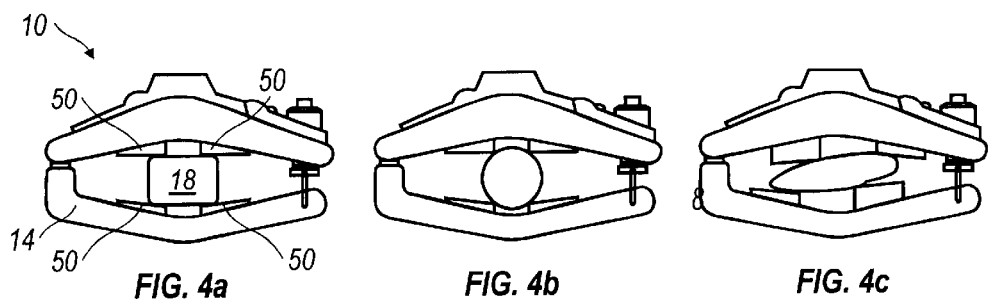
FIGS. 4(a)–(f) are side elevational views of various configurations of an assembled securement arrangement mounted about exemplarily shaped and sized railings and cross members.
Figures 4D, 4E, 4F:
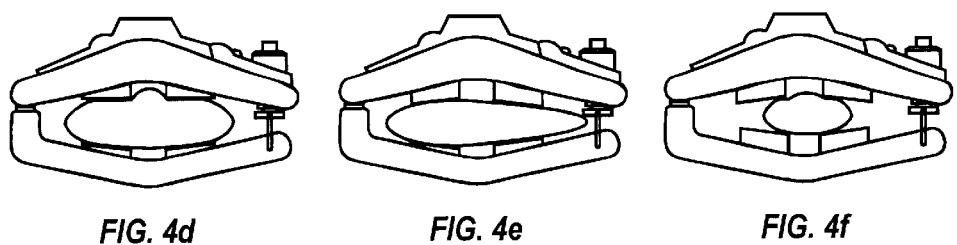

Referring back to the several configurations of FIG. 4, it may be appreciated that eight discreet positions are indicated. By identifying these positions for fitting members, various configurations for accommodating differently configured rack system bars or rails may be established. Utilizing the illustrated scheme for variously arranging four fitting members in the securement arrangement, a wide array of differently shaped rail or cross bar members may be accommodated and secured within the defined interior spaces of FIGS. 4(a)–(f).

Figure 8:
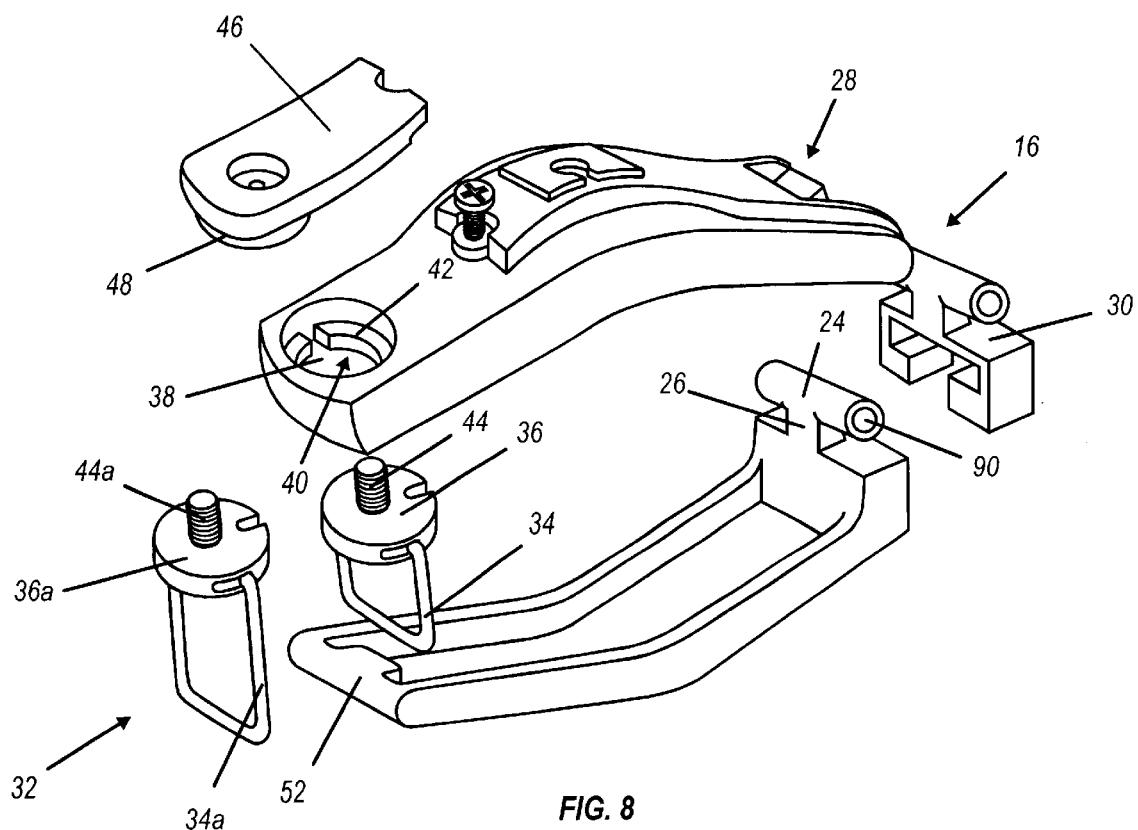
FIG. 8 is an exploded perspective view showing details of the several components of the securement assembly constructed substantially according to the embodiment of FIG. 3.

Referring to FIG. 8, an exploded view of another embodiment of a securement arrangement configured according to the present invention is shown. In this configuration, the hinge at the right side of the arrangement includes an elevated hinge pin 24 supported upon a central post 26. The hinge pin 24 is configured to be seated in a receiver 28 of the right end of the upper body member 12. The interior space of this receiver is configured for a substantially conformance fit about the hinge pin 24, and preferably in a snapping relationship so that the hinge pin 24 is retained in the receiver until intentionally disengaged therefrom.

An auxiliary component 30 is also illustrated at the right hand end of the arrangement which serves as a hinge extension. As explained hereinabove, the design of different vehicles often dictates relatively large rack members such as those provided on certain sport utility vehicles. The extreme size of some members can necessitate expansion of the interior space of the securement arrangement. The hinge extension provides a receiving space for connecting to the hinge pin at its lower end and a replication of the hinge pin at its top end. In this way, the action of hinge assembly is not substantially altered, but the axis about which pivotation of the upper body member occurs is raised. The end result is that larger rails and cross members may be accommodated without the upper and lower body members having to be skewed away from their illustrated orientations.

A clasping arrangement 32 is provided at the opposite end of the securement arrangement to the hinge assembly and has as a primary component a bail assembly 34 configured to be received in a recess of the upper body member 12. As shown, a wire bail is configured in a squared U-shape having inwardly projecting ears at top ends thereof. The wire bail is constructed from material having suitably resilient qualities that permit a technician to bend out the ears for positioning, but that causes them to snap into apertures provided on the disk-shaped upper platform 36. As a complement to the auxiliary extension member for the hinge mechanism, wire bails of differing configurations may be interchangeably provided for accommodating differently sized rails or cross members. This interchangeable concept of bails is illustrated in FIG. 8 where two bails of different lengths are shown for possible interchange.

The bail and platform are assembled together with the upper body member by inserting the bail down through a receiving aperture 38 from below. The aperture is provided with a circumferential lip 40 that impedes the passage of the platform completely through the aperture. This lip 40 is topped by an upper cam surface 42. A threaded upwardly extending post 44 is provided off of the platform. In one embodiment, a fastener 60, e.g., a hex nut, in the lever handle 46 fastens the lever handle 46 to the upper body member 12 via the threaded extending post 44.

A lever handle 46, with a cam 48 provided on a lower surface thereof, is installed so that the cam extends into a top portion of the aperture 38 so that a lower surface of the cam engages the top cam surface 42 of the peripheral lip 40. Referring to FIG. 3, an adjustment knob 50 is shown threaded upon the post. By advancing the adjustment knob on the threaded post until the knob engages the top surface of the lever, assembly of the lever handle on the upper body member 12 and together with the bail assembly is accomplished. FIG. 3, together with FIG. 8, shows that the lower bite portion of the bail, in a closed configuration, is clipped under a projection tab 52 that is found at the left end of the lower body member 14.

Referring to the embodiment of FIG. 3, it may be appreciated that a threaded nut can be positioned either within, or below the upper body member for threaded engagement with a threaded anchor extending down through an access aperture to the nut. It is by this configuration that an article, such as a load carrier, is mounted upon the securement arrangement of the present invention.

As an initial assembly step for establishing the securement arrangement of the present invention, the hinge assembly is first established and the several fitting members are installed into the receiving cavities of the body members according to a provided "fit guide." The fit guide correlates proper fit member configuration in the body member(s) for best fits upon rails and/or cross members of a specific vehicle. In this regard, the fit guide may be presented in table format indicating at which locations within the body members fitting members are to be utilized, and the orientation of those fitting members. In this way, various combinations may be prescribed that establish differing interior space definitions of the securement assembly as is exemplarily illustrated in FIGS. 4(a)–(f).

In operation, the securement arrangement is first configured to an open orientation with the upper and lower body members pivoted away from one another. As shown in FIG. 8, the lower body member is generally V-shaped. This shape serves as an accommodation for that member's insertion under rack rails or cross members having minimal clearance between the member and the supporting surface of the vehicle. The securement arrangement is then closed in a clamping manner about the rail or cross member.

Figure 5:
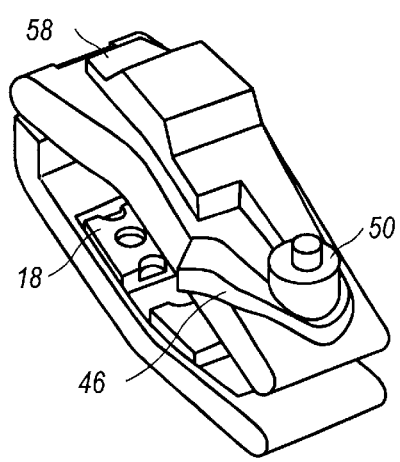
FIG. 5 is a perspective view of the securement assembly of FIG. 3 showing the lever handle in an open orientation.
Figure 6:
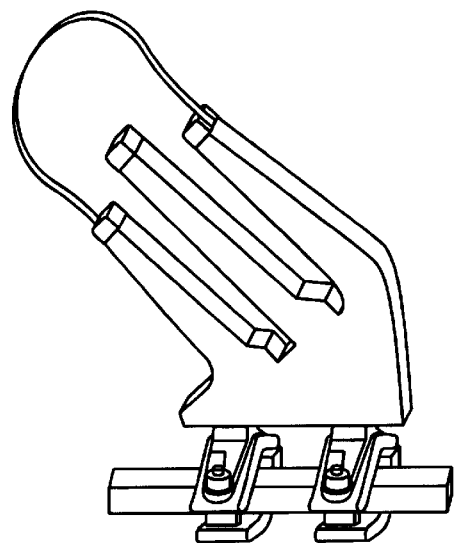
FIG. 6 is a perspective view showing the utilization of two securement assemblies for connecting a ski carrier to a cross bar of a rack arrangement.
Figure 7:
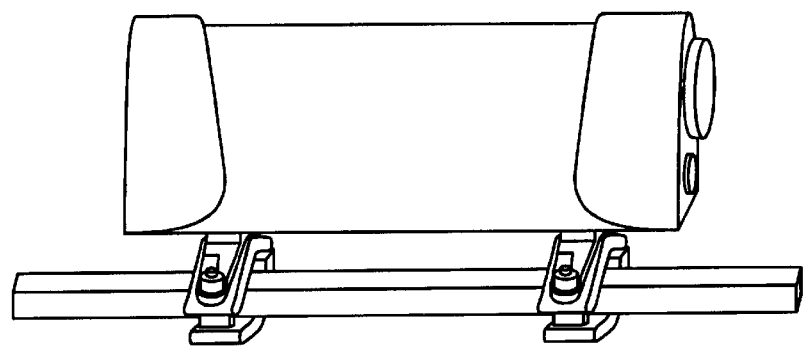
FIG. 7 is a perspective view showing the utilization of two securement assemblies for connecting an alternatively styled ski carrier to a cross bar of a rack arrangement.

The bite of the bail is extended under the tab on the lower body member and the adjustment knob is tightened thereby establishing a pressing, but not tightened fit of the securement arrangement about the rail or cross member. The lever handle which is in an open configuration such as indicated in FIG. 5, is then rotated to the closed position as shown in FIG. 3. By the interaction of the opposed cam surfaces, that is, those on the lever and peripheral lip 40 in the aperture 38, rotation of the lever handle 46 causes a specific additional tightening of the body members about the rail or cross member. This final tightening effect is important because it can be accurately controlled so that a proper amount of a force is imposed in the closed connection. Still further, it can be calibrated for the user's choice by providing certain position markings with respect to the degree of rotation toward the completely open position of the lever handle during initial installation. For example, if a small cross bar is being mounted upon, and a relatively small final "squeeze" is appropriate, the handle may be prescribed in the fit guide to be left at the one quarter position as shown in FIG. 5 when the adjustment knob is tightened. If a substantially larger railing is being mounted upon, a greater "squeeze" may be prescribed and therefore the lever handle can be instructed to be more fully opened. For example, a fully open configuration of the lever handle may require that it be oriented perpendicularly to a longitudinal axis of the body members thereby causing more travel of the body members toward one another in the final clamping stages under the action of the lever handle.

In another aspect, the lever handle also serves as a quick release by enabling a user to quickly back off the imposed tightening pressure so that the bail may be disengaged from under the anchoring tab and the securement arrangement opened by pivoting the two body members apart for disengagement off of the rail or cross member.

As in all rack and load carrier assemblies, security is a prime concern. Therefore, the present invention incorporates lock arrangement(s) for helping to assure that unauthorized disengagement of the securement arrangement from a transporting vehicle is avoided. FIG. 3 illustrates two possible locking mechanisms that may be used either singularly, in tandem, or in combination with other lock arrangements. As may be best appreciated at the top surface of the upper body member in FIG. 3, a translating locking member 54 is provided that can be slid into, and out of engagement with a receiver at the distal end of the lever handle. For simplicity, the receiver may be formed as a slotted receiving recess for accepting an insertible tongue of the locking member. In use, once the lever handle is pivoted to the closed position as shown in FIG. 3, the lock member, which would initially be in a retracted orientation, that is, translated to the right in FIG. 3, is pushed into a locked configuration as is depicted in FIG. 3.

Side tabs 56 are provided about the right end of the lock member so that the member cannot be grasped and pulled for disengagement or manual unlocking. Instead, an access aperture 58 is provided at the top of the upper body and which extends down to the lock member 54.

A specially configured key must be utilized that can be inserted through the access aperture and engaged in the lock member for sliding the member out of engagement with the lever handle. In this manner, the unlocking function is performed. Still further, the access aperture is covered when an article, such as a load carrier, is installed upon the securement arrangement. In this manner, the locking function is further reinforced.

In addition to the translating locking arrangement described above, a threaded lock arrangement is also shown in FIG. 3. In this arrangement, a tapped aperture is provided through the upper body member toward the lever handle. A threaded bolt or screw may be installed through the aperture and landed and tightened into a tap in the lever handle. By requiring a specially configured key to operate (rotate) the bolt or screw, unauthorized disengagement of this lock mechanism is prevented. As indicated above, either of these lock configurations may be utilized either independently, in tandem, or in combination with other locking mechanisms and procedures.

Figure 9:
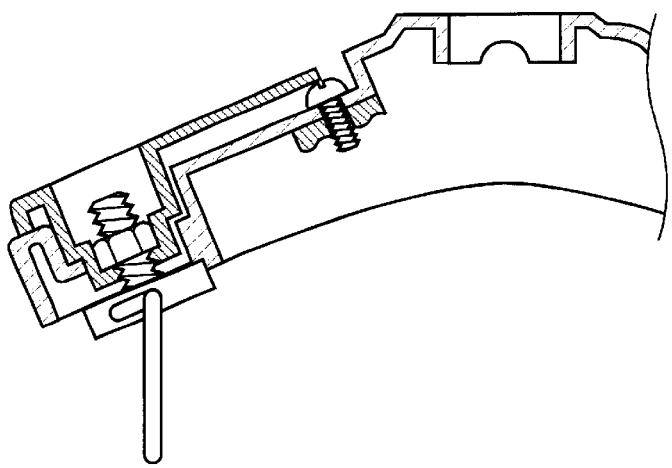
FIG. 9 is a cross sectional view showing the bail assembly and in a fully tightened configuration.

Referring to FIG. 9, a cross sectional view showing the bail assembly in the fully tightened configuration is illustrated. As shown, the lever handle 46 rests in a recess provided therefore on the upper body member 12 in the tightened configuration. As a result, the lever handle 46 is flush with the rest of the upper surface of the upper body member 12.

Figure 10:
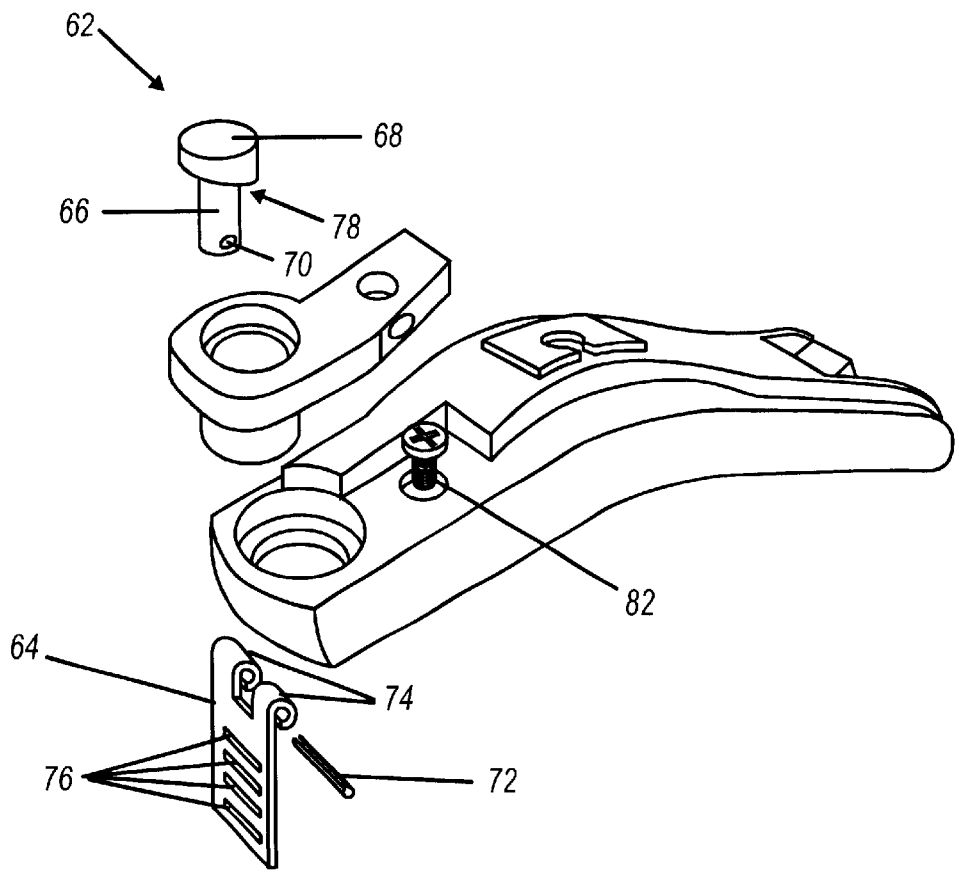
FIG. 10 is a perspective view of an alternative tightening configuration.

Referring to FIG. 10, a perspective view of an alternative tightening configuration is illustrated. As shown, a metal button 62 and a strap 64 form a clasping arrangement 32 configured to be received in a recess of the upper body member 12. The metal button 62 includes a shaft 66 having a cam shaped head 68 about an upper end of the shaft 66 and an aperture 70 is provided at a lower end of the shaft 66. The cam shaped head 68 allows the metal button 62 to rotate about one-hundred-eighty degrees (180°) within an angled track 78 within a lever handle 80. The lever handle 80 is configured to rotate within the recess in the upper body member 12. As shown, the lever handle 80 is shaped in such a manner as to "mate" with the upper surface of the upper body member 12. A fastener 82, e.g., a screw, fastens the lever handle 80 to the upper body member 12.

The strap 64 is secured to the metal button 62 using a pin 72. The pin 72 is inserted through receivers 74 at a distal end of the strap 64 and through an aperture 70 in the shaft 66 of the metal button 62. The strap 64 includes one or more slots 76 configured to interact with the projection tab 52 (illustrated in FIG. 8) thus securing the upper body member 12 with the lower body member 14 via the metal button 62 and strap 64 clasping arrangement 32. The strap 64 is constructed from material having suitably resilient qualities that permit releasable engagement between a slot 76 and the projection tab 52. The tightening or tightness between the upper body member 12 and lower body member is dependent on which slot 76 is utilized.

Figure 11:
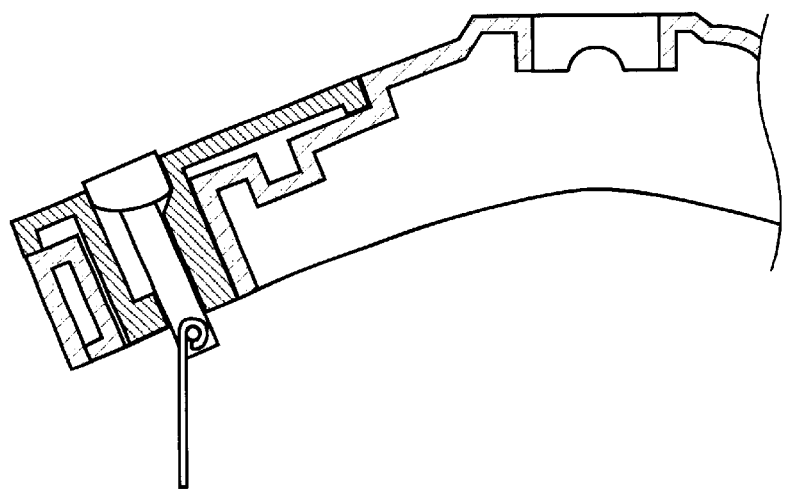
FIG. 11 is a cross sectional view of the tightening configuration of FIG. 10 in the fully tightened configuration.

Referring to FIG. 11, a cross sectional view of the tightening configuration of FIG. 10 in the fully tightened configuration is illustrated. As shown, the lever handle 80 rests upon the upper body member 12 in the tightened configuration. As a result, the lever handle 80 is flush with the rest of the upper surface of the upper body member 12.

Figure 12:
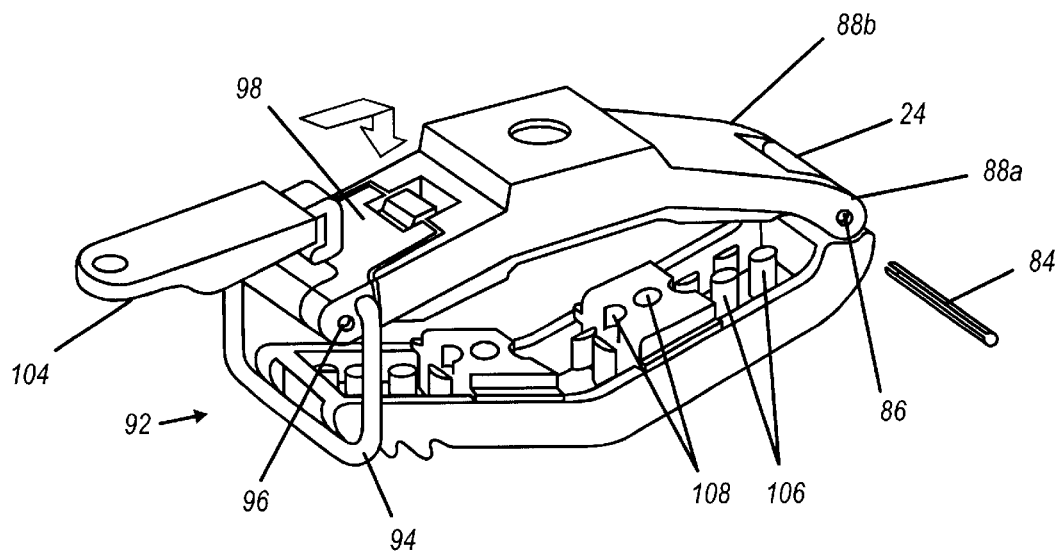
FIG. 12 is a perspective view of an alternative tightening configuration and seating arrangement for the resilient fitting members.

Referring to FIG. 12, a perspective view of an alternative tightening configuration and seating arrangement for the resilient fitting members is illustrated. As shown, a connecting pin 84 connects the upper body member 12 and the lower body member 14 at one end of the securement arrangement 10. The connecting pin 84 passes through an aperture 86 on flanges 88a, 88b of the upper body member 12 and through an aperture 90 (FIG. 8) in the elevated hinge pin 24 of the lower body member 14.

Figure 13:
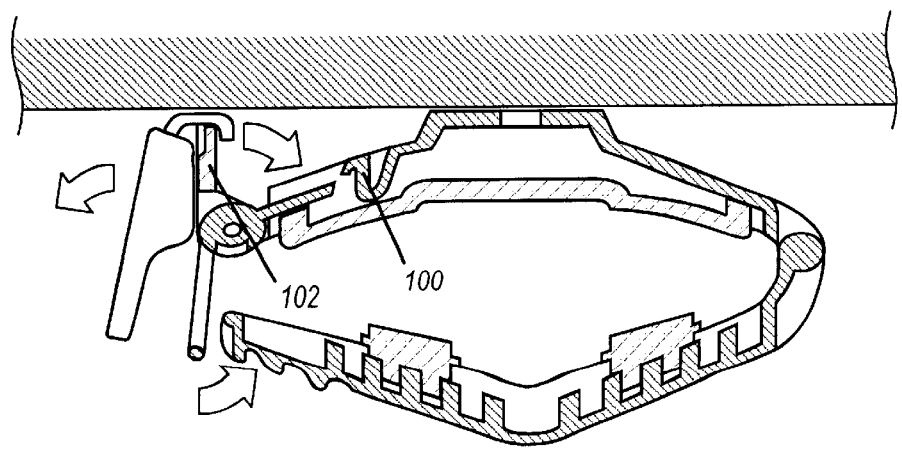
FIG. 13 is a cross sectional view of the configuration of FIG. 12.

A buckle or clasping arrangement 92 pivotally connects to the upper body member 12 and secures the upper body member 12 and the lower body member 14 on the opposite end of the securement arrangement 10. A bail assembly 94 includes a wire bail similar to the bail assembly 34 in FIG. 8 attached to a buckle portion 98. One or more buckle recesses 96 underneath the lower body member 14 is configured to receive the wire bail. The tightening of the securement arrangement 10 depends on which buckle recess 96 is used. Once the buckle arrangement is secured, the upper body member 12 is secured to the lower body member 14. As shown in FIGS. 12 and 13, a lip 100 on the upper body member 12 interacts with a ledge 102 on the buckle portion 98 in a secured configuration (FIG. 12). The lip 100 is constructed of a flexible material which allows for the lip 100 to be moved, e.g., flexed, by a key 104 as illustrated in FIG. 13 thus disconnecting the upper body member 12 from the lower body member 14 on one end of the securement arrangement 10.

Referring to FIGS. 12 and 13, resilient fitting members 18 are secured to the lower body member 14 via one or more fitting pegs 106. As shown, the fitting members 18 includes one or more apertures 108. The fitting member apertures are configured to receive one or more fitting pegs 106 thereby selectively positioning the fitting member 18 in the cavity 20 within the lower body member 14. Similarly, the upper body member 12 can include a similar arrangement for selectively positioning the fitting members 18 therein.

Figure 14:
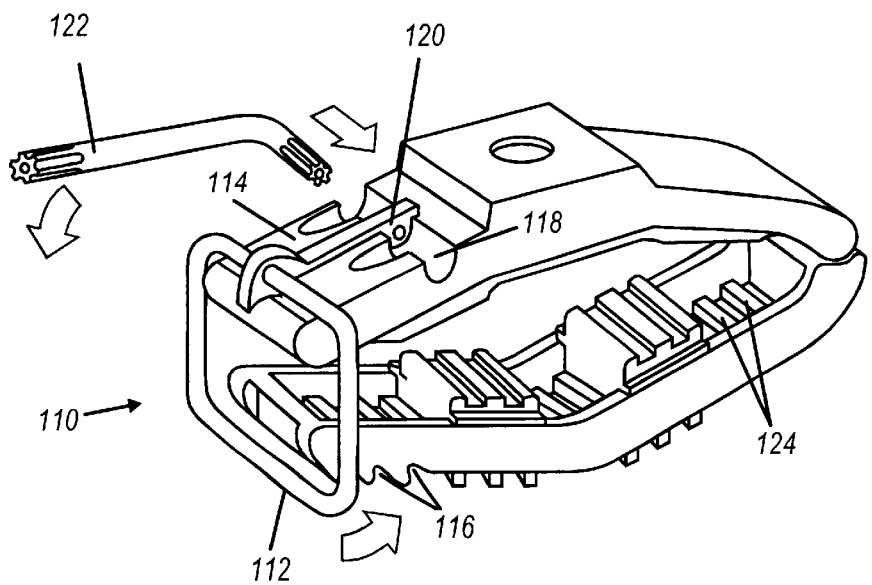
FIG. 14 is a perspective view of an alternative tightening configuration and seating arrangement for the resilient fitting members.

Referring to FIG. 14, a perspective view of an alternative tightening configuration and seating arrangement for the resilient fitting members is illustrated. As shown, an alternative buckle or clasping arrangement 110 pivotally connects to the upper body member 12 and secures the upper body member 12 with the lower body member 14 on the opposite end of the securement arrangement 10. The buckle arrangement 110 includes a bail assembly 112 having a wire bail similar to the bail assembly 34 in FIG. 8 attached to a buckle portion 114. One or more buckle recesses 116 underneath the lower body member 14 is configured to receive the wire bail. The tightening of the securement arrangement 10 depends on which buckle recess 116 is used. Once the buckle arrangement 110 is secured, the upper body member 12 is secured to the lower body member 14.

Figure 15:
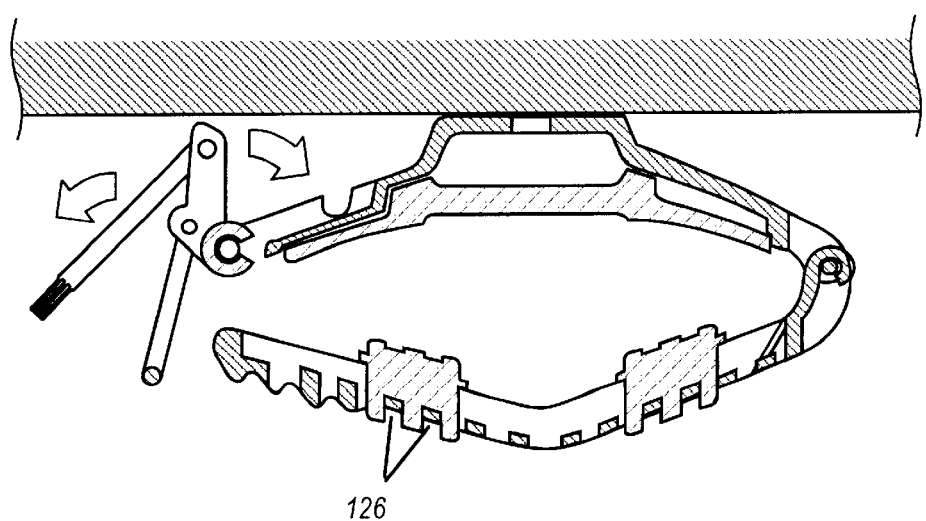
FIG. 15 is a cross sectional view of the tightening configuration of FIG. 14.

The buckle arrangement 110 includes a groove 118 in the buckle portion 114 and key receiving portion 120 which is pivotally connected to the buckle portion and to which the wire bail attaches. The groove 118 is configured to receive a key 122, e.g., a hex head wrench, within an aperture (hex shaped in the preferred embodiment) 124 in the key receiving portion 120. As shown in FIGS. 14 and 15, the key 122 is used to "unbuckle" the upper body member 12 from the lower body member 14, thus disconnecting the upper body member 12 from the lower body member 14 on one end of the securement arrangement 10.

Referring to FIGS. 14 and 15, resilient fitting members 18 are secured to the lower body member 14 via one or more fitting ridges 124. As shown, the fitting members 18 includes one or more grooves 126. The fitting member grooves 126 are configured to receive one or more fitting ridges 124 thereby selectively positioning the fitting member 18 in the cavity 20 within the lower body member 14. Similarly, the upper body member 12 can include a similar arrangement for positioning the fitting members 18.

Figure 16:
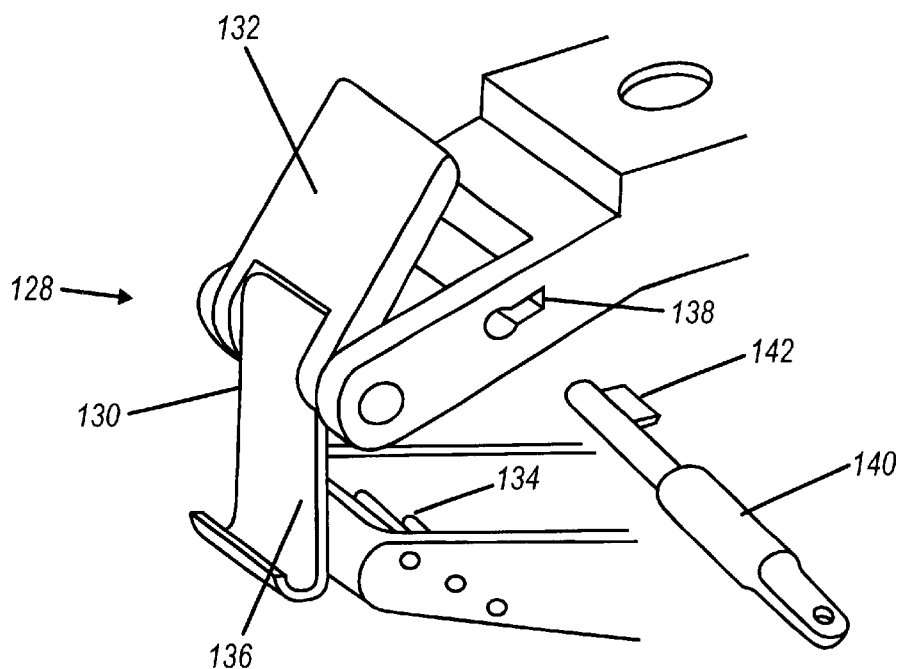
FIG. 16 is a perspective view of an alternative tightening configuration.

Referring to FIG. 16, a perspective view of an alternative tightening configuration is illustrated. As shown, an alternative buckle or clasping arrangement 128 pivotally connects to the upper body member 12 and secures the upper body member 12 with the lower body member 14 on the opposite end of the securement arrangement 10. The buckle arrangement 128 includes a bail assembly 130 having a J-shaped hook portion 136 attached to a buckle portion 132. The lower body member 14 includes one or more buckle rods 134 extending across the cavity 37 with the Jj-shaped hook portion 136 interacting with one of the buckle rods 134 to secure the upper body member 12 and lower body member 14. The tightening of the securement arrangement 10 depends on which buckle rod 134 is engaged. Once the buckle arrangement 110 is secured, the upper body member 12 is secured to the lower body member 14.

Figure 17:
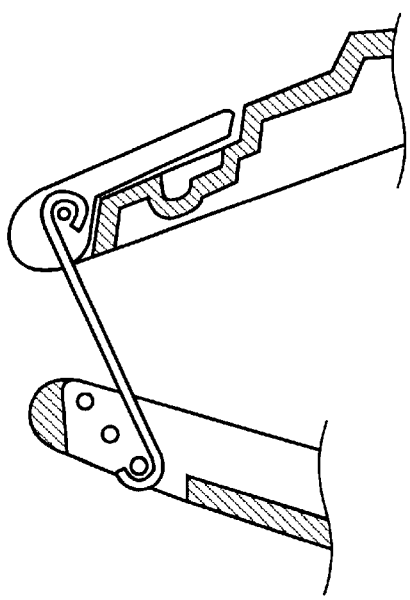
FIG. 17 is a cross sectional view of the tightening configuration of FIG. 16.

The upper body member 12 includes a key receiving portion 138 configured to received a key 140 through a wall of a flange of the upper body member 14. As shown in FIG. 16, the buckle portion 132 is released using one or more teeth 142 on the key 140 when the key 140 is inserted into the key receiving portion 138 and rotated. As shown in FIG. 17, the buckle portion 132 is flush with the upper surface of the upper body member 12 when the buckle arrangement 128 is in a secured position.

Figure 18:
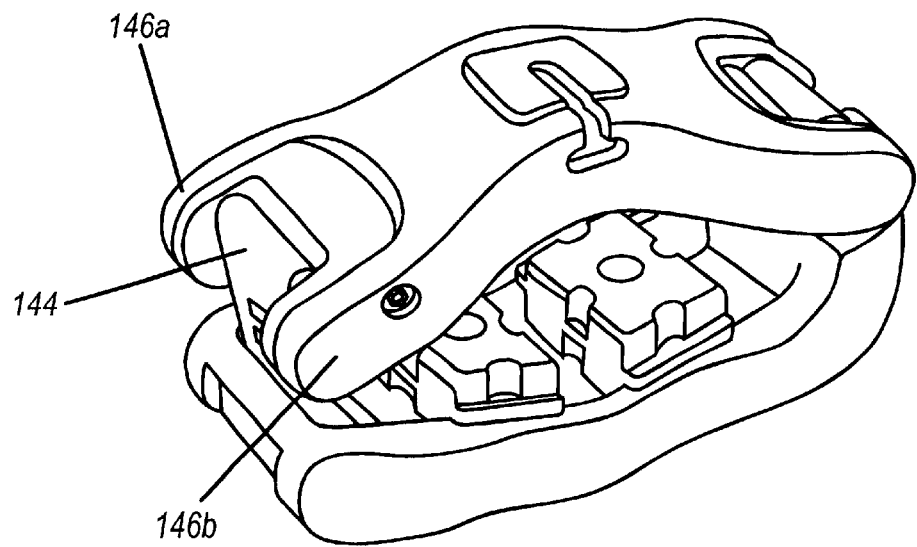
FIGS. 18 and 19 are perspective views of alternative configurations of the present invention.
Figure 20:
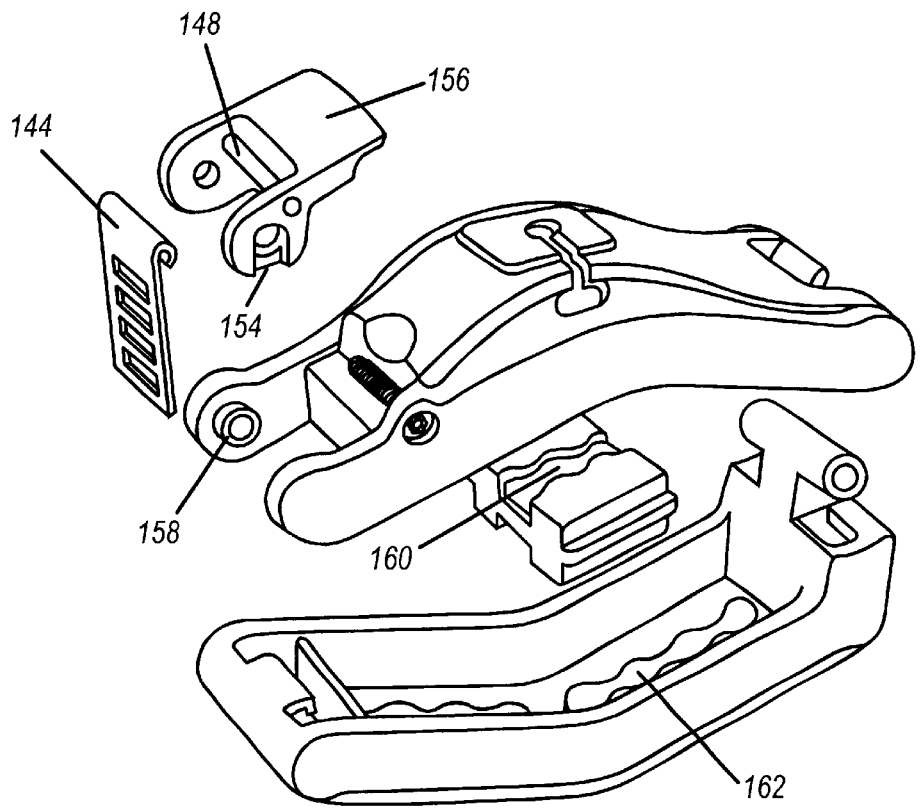
FIGS. 20 and 21 are perspective exploded and assembled views, respectively, of an alternative configuration of the present invention showing an irregular, or wave-form recess and rib mating combination for locating the fitting members in the body members.

Referring to FIGS. 18 and 20, perspective assembled and exploded views are illustrated, respectively, of an alternative configuration of the present invention is illustrated. As shown, the upper body member 12 includes flanges 146a, 146b with each flange having a projection 154 on the inner side thereof. Each projection 158 is configured to be received within a channel 154 on each side of a buckle portion 156. A strap 144 is connected to the buckle portion 156 via a pin (not shown, but similar to the buckle assembly of FIG. 11). The strap 144 connects the upper body member 12 with the lower body member 14. The strap 144 includes one or more slots 150 which interact with a projection tab 52. The tightening or tightness between the upper body member 12 and lower body member is dependent on which slot 150 is utilized.

Figure 19:
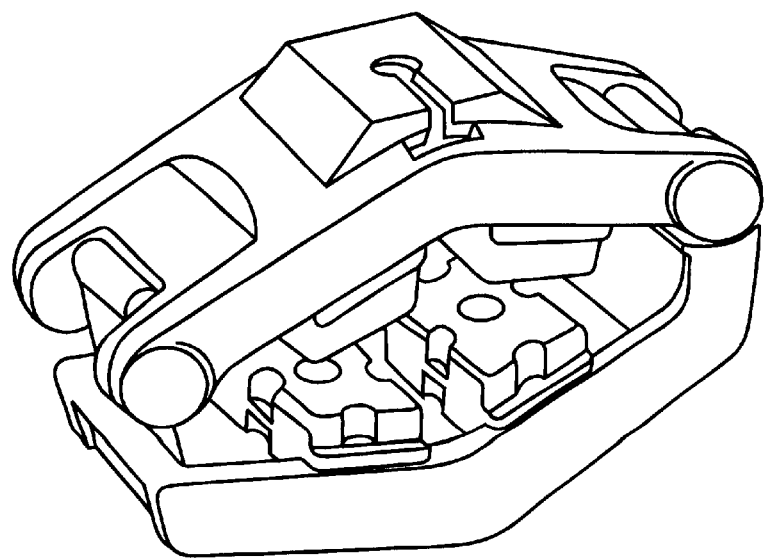

Referring to FIG. 19 a perspective view of an alternative configuration of the present invention is illustrated. As shown, a J-shaped hooking portion 152 (similar to the J-shaped hooking portion 136 of FIG. 10) connects the upper body member 12 with the lower body member 14 using a buckle rod (not shown but similar to the one or more buckle rods 134 shown in FIGS. 16 and 17). The tightening or tightness between the upper body member 12 and lower body member is dependent on which buckle rod is utilized.

Figure 21:
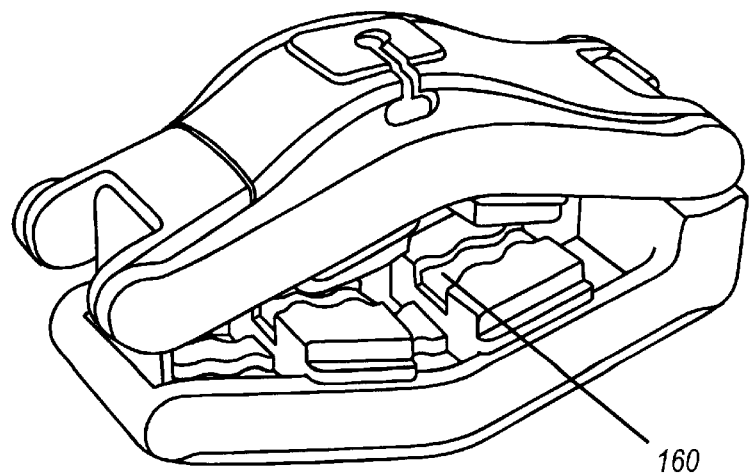

Referring to FIGS. 20 and 21, exploded and assembled views and a perspective view of an alternative configuration of the present invention showing an irregular, or wave-form recess and rib mating combination for locating the fitting members in the body members is illustrated. As shown, the fitting members 18 include one or more irregular, or wave-form recesses 160. The wave-form recesses 160 are configured to receive one or more mating rib members 162 thereby selectively positioning the fitting member 18 in the cavity 20 within the lower body member 14. Similarly, the upper body member 12 can include a like arrangement for positioning fitting members 18.

Figure 22:
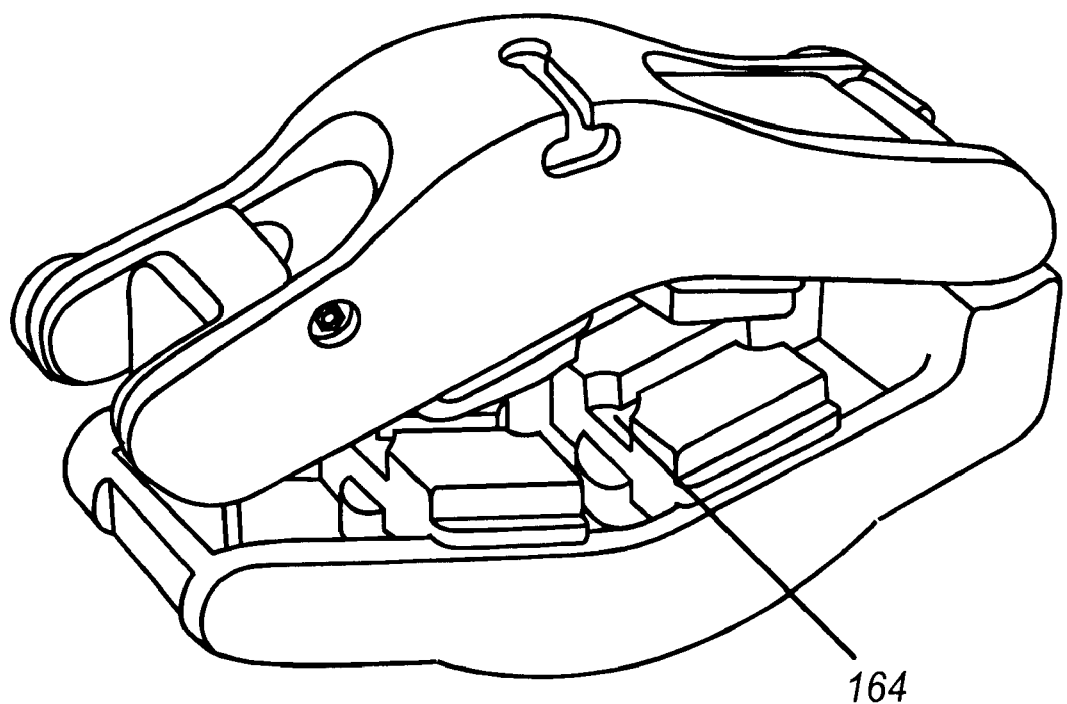
FIG. 22 is a perspective view of an alternative configuration of the present invention showing a dumb bell-shaped recess and mating combination for fixedly locating the fitting members in the body members.

Referring to FIG. 22, a perspective view of an alternative configuration of the present invention showing a dumb bell-shaped recess and mating combination for fixedly locating the fitting members in the body members is illustrative. As shown, the fitting members 18 include one or more dumb bell-shaped recesses 164. The uniquely shaped recesses 164 are configured to receive one or more similarly shaped ribs 166 thereby positioning the fitting member 18 in the cavity 20 within the lower body member 14. Similarly, the upper body member 12 can include a like arrangement for properly positioning upper fitting members 18.

Figure 23:
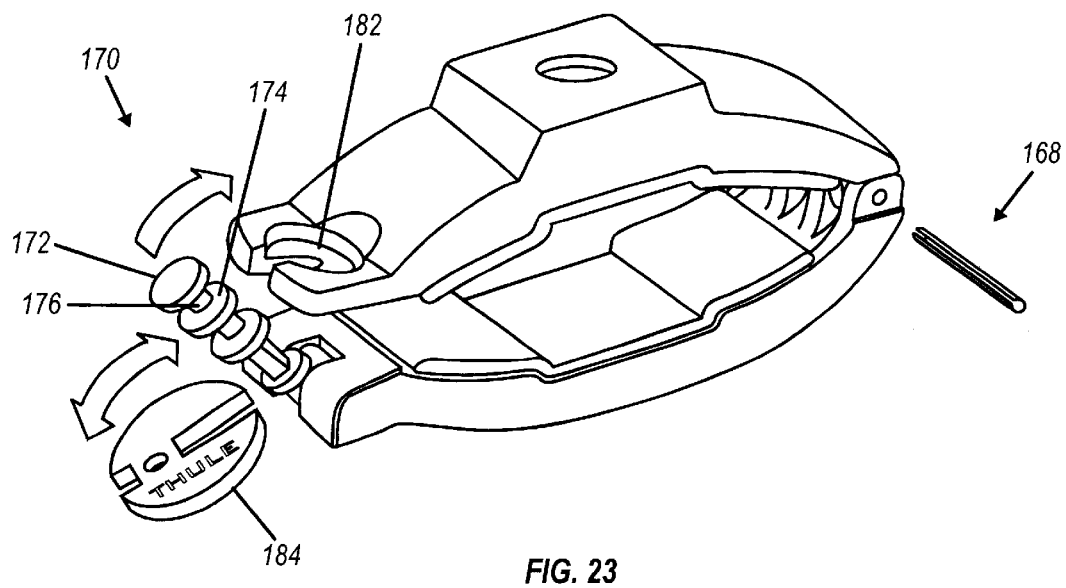
FIG. 23 is a perspective view of an alternative tightening and resilient buffering member configuration.
Figure 24:
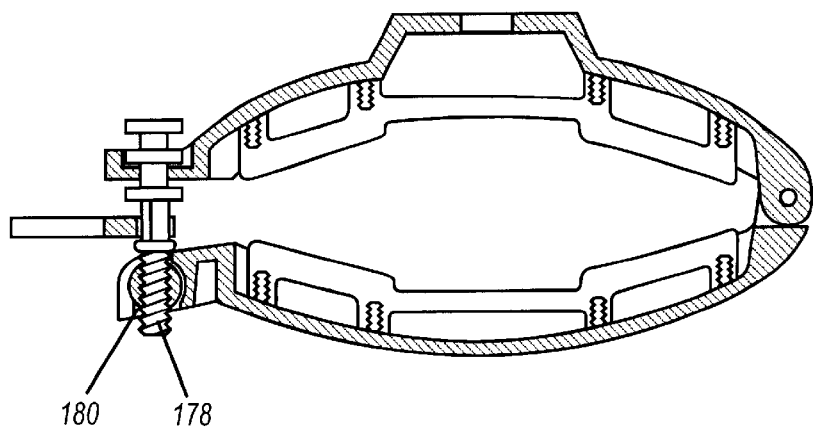
FIG. 24 is a cross sectional view of the configuration of FIG. 23.

Referring to FIGS. 23 and 24, a perspective view and a cross sectional view of an alternative tightening configuration are illustrated, respectively. As shown, a connecting pin 168 connects the upper body member 12 and the lower body member 14 at one end of the securement arrangement 10. A collared stem 172 connects the upper body member 12 with the lower body member 14 on the opposite end of the securement arrangement 10. The collared stem 172 is pivotally connected to the lower body member 14 via a shaft 174. The collared stem 172 includes one or more collars 176 fixedly attached to the shaft 176. The shaft 176 includes threads 178 at a lower end thereof with the lower body member 14 including a recess 180 to receive the threads 178 of the shaft 176. To secure the upper body member 12 with the lower body member, the collared stem 172 is positioned to cause a collar 174 to rest within a collar recess 182 within the upper body member 12. The shaft 176 is splined to enable a key 184, e.g., a slotted disc, to rotate the collared stem 172 thus tightening the upper body member 12 with the lower body member 14. Thus the tightening of the upper body member 12 with the lower body member 14 is determined by which collar 174 is used and on the tightening of the threaded shaft 176 within the lower body member 14.

Figure 25:
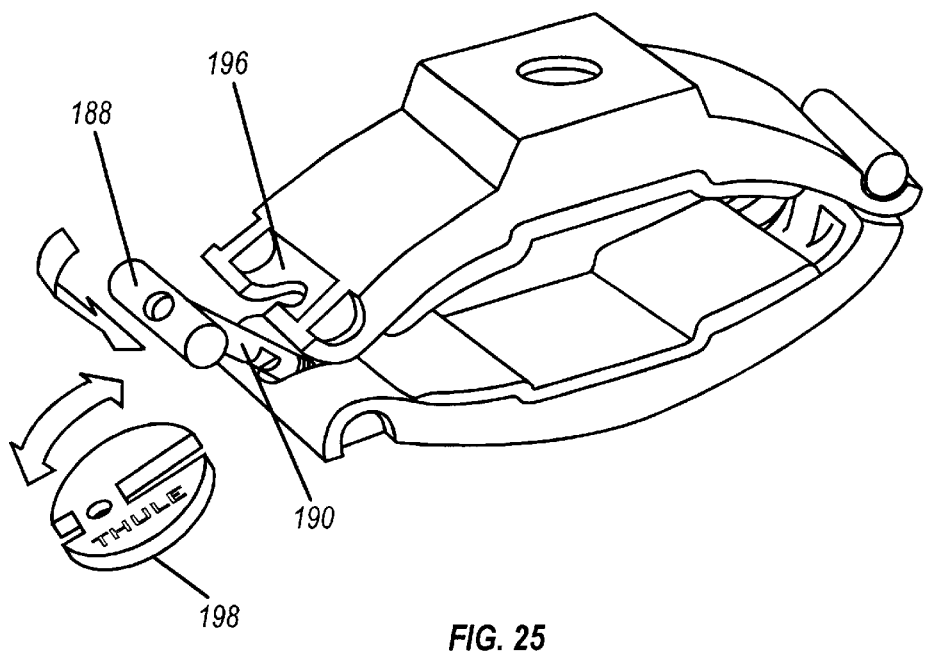
FIG. 25 is a perspective view of an alternative tightening and resilient buffering member configuration.
Figure 26:
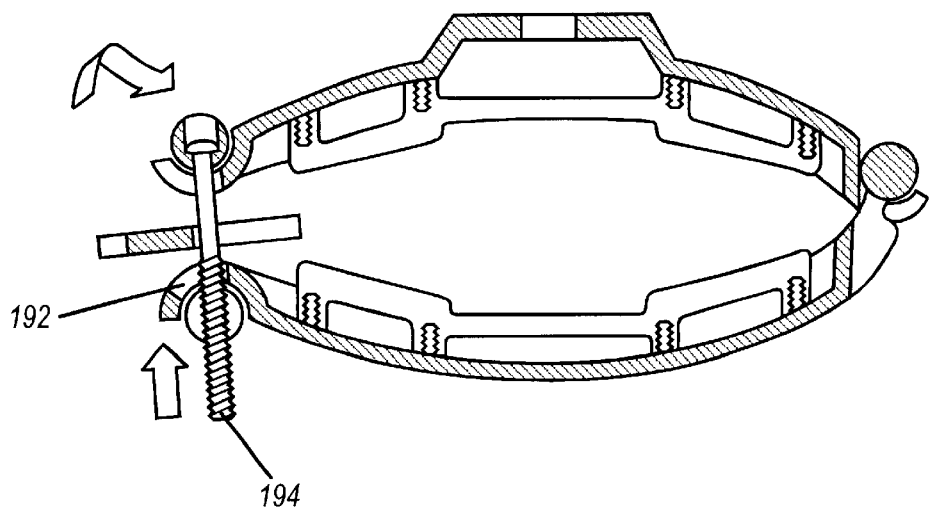
FIG. 26 is a cross sectional view of the configuration of FIG. 25.

Referring to FIGS. 25 and 26, a perspective view and a cross sectional view of an alternative tightening configuration are illustrated, respectively. As shown, flanges 186 at one end of the upper body member 12 interacts with an elevated pin 24 to connect the upper body member 12 and the lower body member 14 on the one end of the securement arrangement 10. A barrel nut 188 on a stem 190 connects the upper body member 12 with the lower body member 14 on the opposite end of the securement arrangement 10. The stem 190 is pivotally connected to the lower body member 14 and is able to pivot within a pivot slot 192. The stem 190 includes threads 194 at a lower end of the stem 190 with the lower body member 14 including a recess 196 to receive the threads 194 of the stem 190. To secure the upper body member 12 with the lower body member, the barrel nut 188 is positioned in a barrel recess 196 within the upper body member 12. The stem 190 is splined to enable a key 198, e.g., a slotted disc, to rotate the stem 190 thus tightening the upper body member 12 with the lower body member 14.

Figure 27:
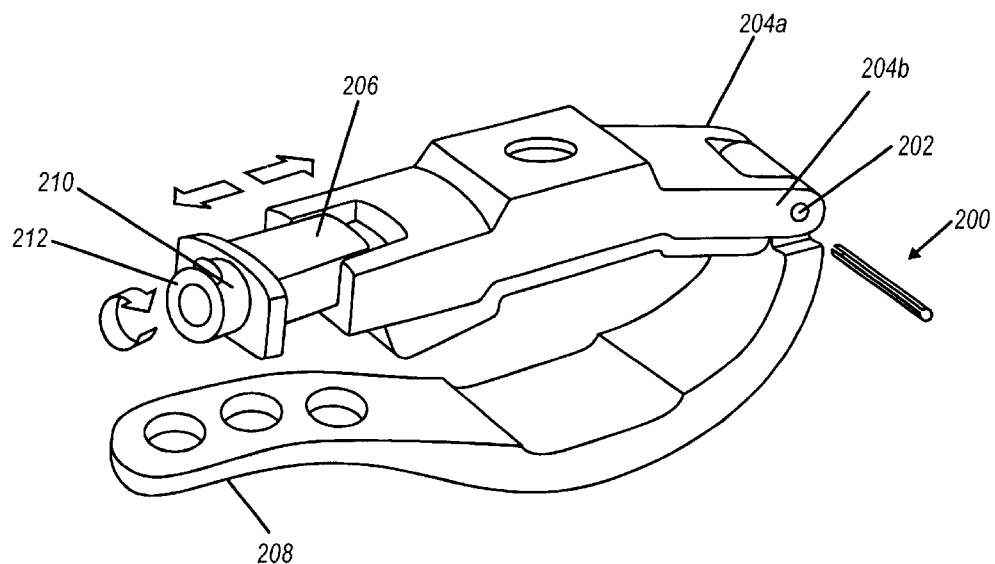
FIG. 27 is a perspective view of an alternative tightening and buffering configuration.

Referring to FIG. 27, a perspective view of an alternative tightening configuration is illustrated. As shown, a connecting pin 200 connects the upper body member 12 and the lower body member 14 on the one end of the securement arrangement 10. The connecting pin 200 passes through an aperture 202 on flanges 204a, 204b of the upper body member 12 and through an aperture 90 (FIG. 8) in the elevated hinge pin 24 of the lower body member 14. At the other end of the securement arrangement 10, a strap receiving portion 206 slidingly engages within the upper body member 12.

Figure 28:
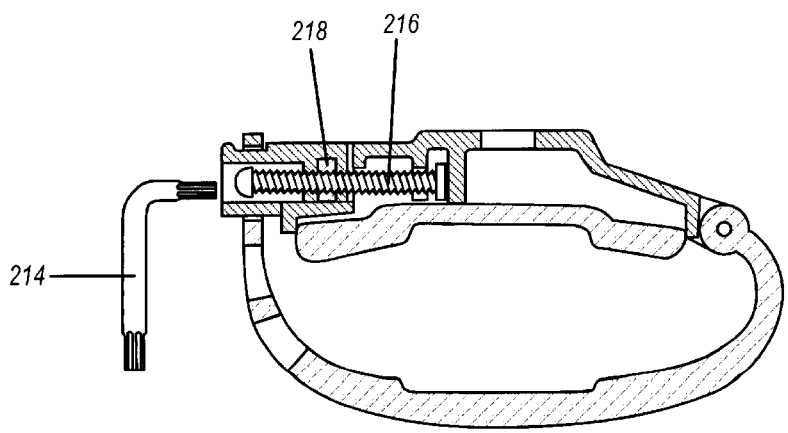
FIG. 28 is a cross sectional view of the configuration of FIG. 27.

Referring to FIG. 28, a cross sectional view of the tightening configuration of FIG. 27 is illustrated. As shown, the strap receiving portion 206 in the upper body member 12 receives a strap portion 208 of the lower body member 14 thereby connecting the lower body member 14 and the upper body member 12. Specifically, one or more apertures 214 within the strap portion 208 are configured to slide over a lip 212 on a strap receiving projection 210, thereby securing the lower body member 14 to the upper body member 12. To tighten the lower body member 14 to the upper body member 12, a key 214, e.g., a hex head wrench, is used to rotate a fastener 216, e.g., a hex headed screw, with a nut 218 within the strap receiving portion 206 receiving the fastener 216.

Figure 29:
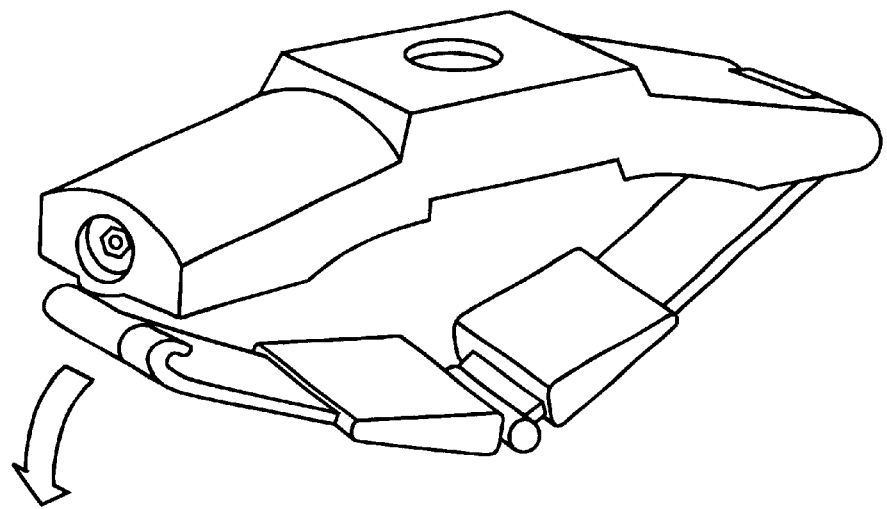
FIG. 29 is a perspective view of a mid-hinged arrangement configured according to the present invention.
Figure 30:
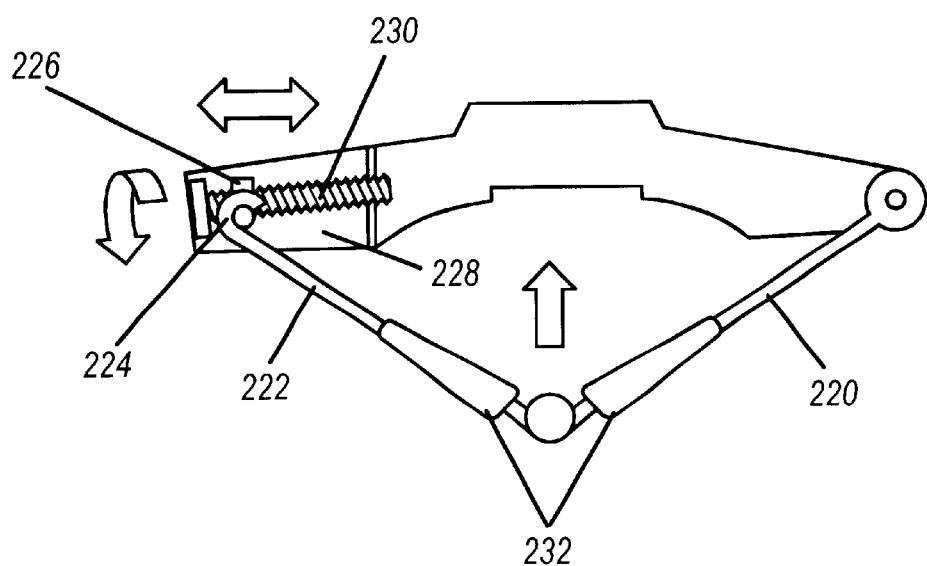
FIG. 30 is a cross sectional view of the configuration of FIG. 29.

Referring to FIGS. 29 and 30, a perspective view and a cross sectional view of an alternative tightening configuration are illustrated, respectively. As shown, the lower body member 14 includes a pivoting member 220 and a j-shaped member 222. The pivoting member 220 is pivotally connected to the upper body member 12 on one end and pivotally connected to the j-shaped member 222 at the other end. The j-shaped member 222 includes a j-shaped distal end 224 configured to connect to a nut with an axis 226 within a j-shaped receiving portion 228 of the upper body member 12. The nut with an axis 226 moves in and out on a fastener 230 with within the j-shaped receiving portion 228 by tightening or loosening the fastener 230. The pivoting member 220 and j-shaped member 222 each include one or more adjustable rubber pads 232.

Figure 32:
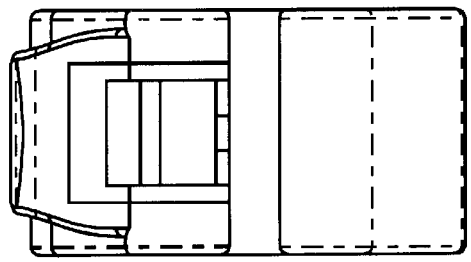
FIGS. 31–33 show an alternative embodiment of the invention and its constituent components.
Figure 31:
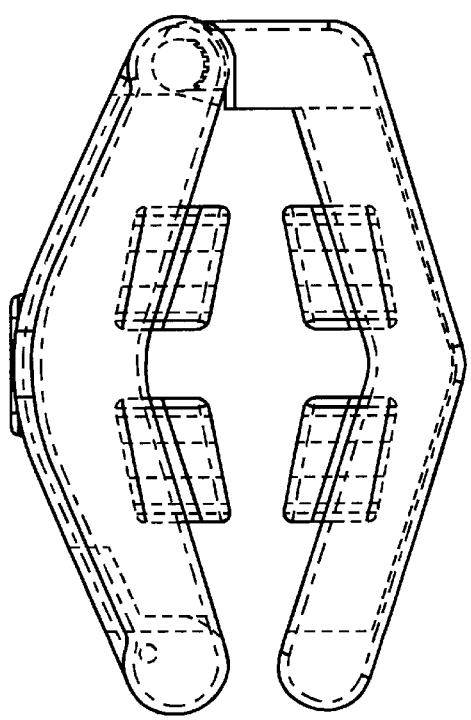
Figure 33:
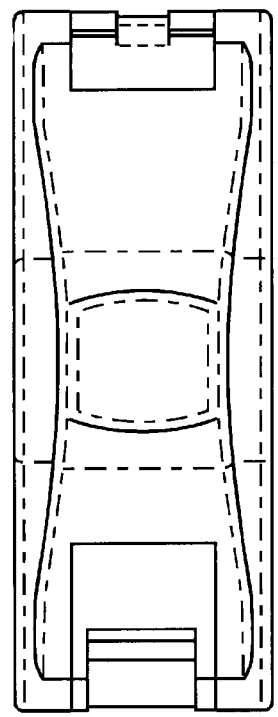

Referring to FIGS. 31–33, a side elevational view, an end elevational view and a top plan view of an exemplary embodiment of the securement arrangement having four fitting members 18 are illustrated, respectively.

Figure 34:
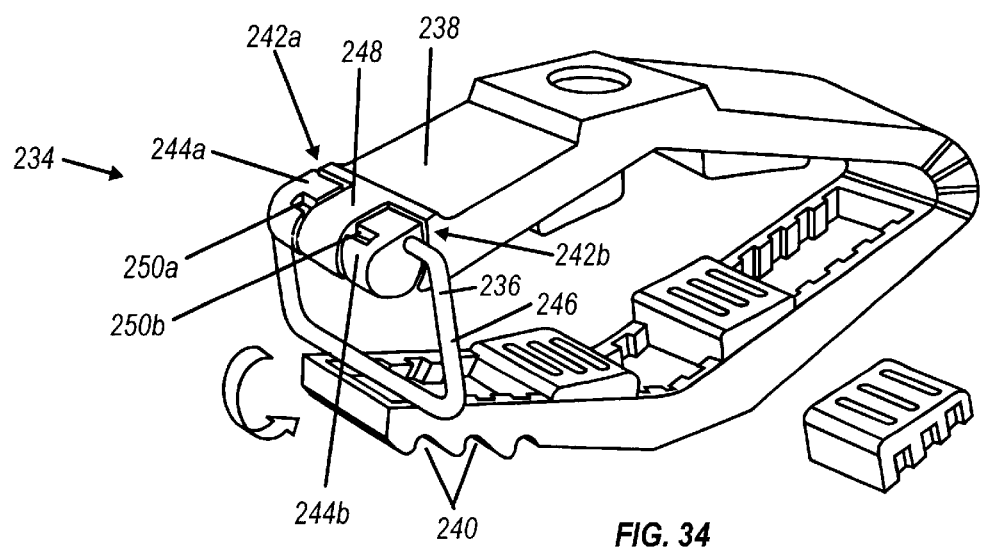
FIG. 34 is a perspective view of an alternative tightening configuration and seating arrangement for the resilient fitting members.

Referring to FIG. 34, a perspective view of an alternative tightening configuration is illustrated. As shown, an alternative buckle or clasping arrangement 234 pivotally connects to the upper body member 12 and secures the upper body member 12 with the lower body member 14 on an end of the securement arrangement 10. The buckle arrangement 234 includes a bail assembly 236 having a wire bail similar to the bail assembly 34 in FIG. 8 attached to a buckle portion 238. One or more buckle recesses 240 underneath the lower body member 14 is configured to receive the wire bail. The tightening of the securement arrangement 10 depends on which buckle recess 240 is used. Once the buckle arrangement 234 is secured, the upper body member 12 is secured to the lower body member 14.

At a distal end, the upper body member 12 includes a buckle central post 248 and tear shaped slots 242a, 242b. The bail assembly 236 includes two tear shaped bail receiving portions 244a, 244b pivotally connected to the buckle central post 240 in the tear shaped slots 242a, 242b, respectively. Each tear shaped bail receiving portion 244a, 244b includes an aperture (not shown) for receiving an end of a square shaped bail 246 and are positioned to produce an over-center locking effect in the secured configuration. In addition, each of the tear shaped bail receiving portions 244a, 244b include a key slot 250a, 250b configured to receive a key 252. To lock the upper body member 12 with the lower body member 14, the bail is positioned within a buckle recess 240, the key 252 is inserted into one or both of the key slots 250a, 250b and rotated to have the tear shaped bail receiving portions 244a, 244b flush with the upper surface of the upper body member 12, e.g., in a locked over center position.

Figure 35:
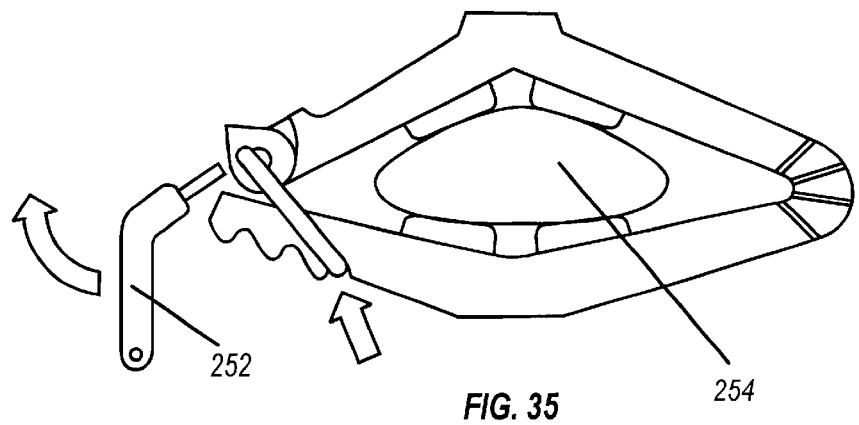
FIG. 35 is a cross sectional view of the configuration of FIG. 34 mounted on an elliptically shaped rail or cross bar member.
Figure 36:
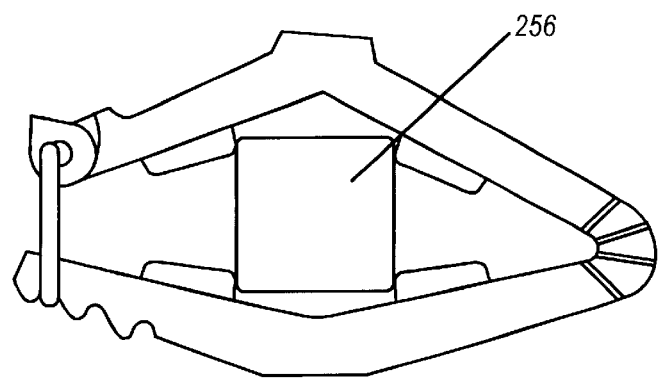
FIG. 36 is a cross sectional view of the configuration of FIG. 34 mounted on a square-shaped rail or cross bar member.

Referring to FIGS. 35 and 36, elevational views of the tightening configuration of FIG. 34 mounted on (1) an elliptically shaped rail or cross bar member and (2) a square-shaped rail or cross bar member are illustrated. As shown, the fitting members 18 are positioned within the upper body member 12 and the lower body member to receive a an elliptically shaped rail or cross bar member 254 or a square-shaped rail or cross bar 256, respectively. As illustrated in FIG. 35, the wire bail 246 is positioned in its tightest position. As illustrate in FIG. 36, the wire bail 246 is positioned in a looser position compared to the wire bail position shown in FIG. 35.

Figure 37:
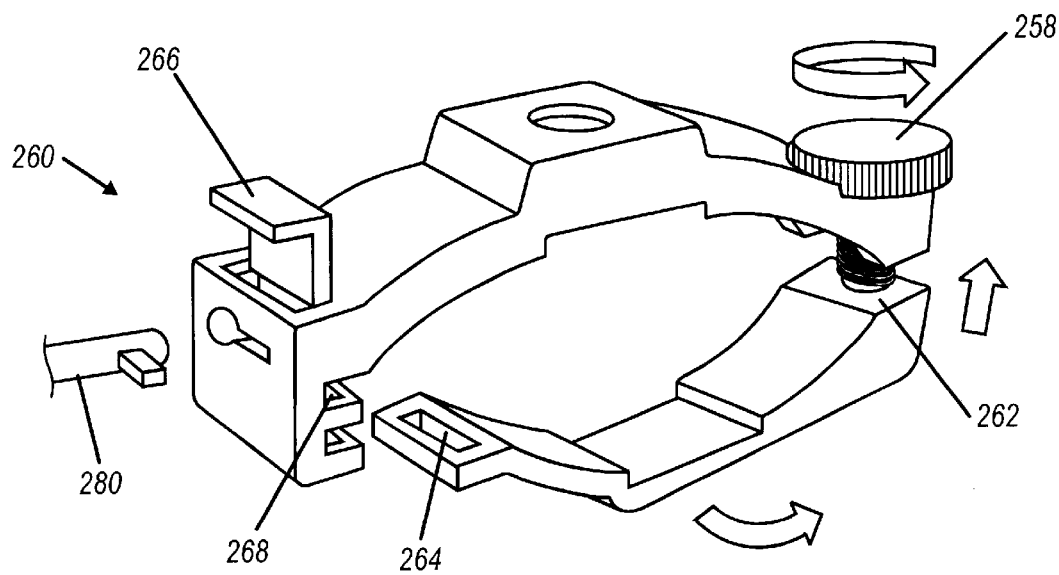
FIG. 37 is a perspective view of an alternative tightening and buffering configuration.

Referring to FIG. 37, a perspective view of an alternative tightening configuration is illustrated. As shown, the upper body member 12 includes an aperture (not shown) configured for receiving a fine tuning screw 258 at one distal end and an "L-shaped"0 locking clamp arrangement 260 at the other distal end. The lower body member 14 includes a threaded aperture 262 configured to receive the fine tuning screw 258 at one distal end and a slot 264 configured to receive an "L clamp" 266 at the other distal end, e.g., slot end. Thus the upper body member 12 and lower body member 14 are pivotally connected at one end and clamped at the other end. The L-shaped locking clamp arrangement 260 includes one or more clamp slots 268 for receiving the slot end of the lower body member 14 and the L-clamp 266 when the L clamp 266 is engaged in an engaged position.

Figure 38:
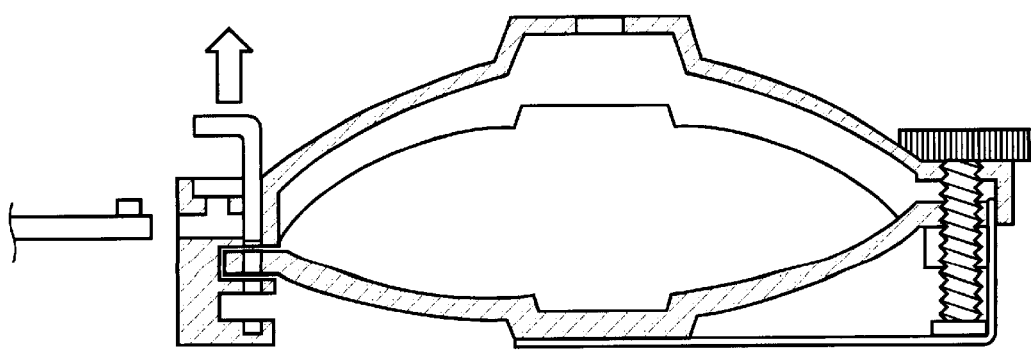
FIG. 38 is a cross sectional view of the configuration of FIG. 37.

Referring to FIG. 38, a cross sectional view of the tightening configuration of FIG. 37 is illustrated. As shown, the L clamp 266 is in a locked position in which an end of the L clamp 266 engages one or more clamp slots 268 and the slot 264 of the slot end of the lower body member 14. A key 270 is used to engage and disengage L clamp 266 within the one or more clamp slots 268 and the slot 264. Once the slot end of the lower body member 14 and upper body member 12 are connected, the fine tuning screw 258 is rotated thereby tightening the lower body member 14 and upper body member 12.

Figure 39:
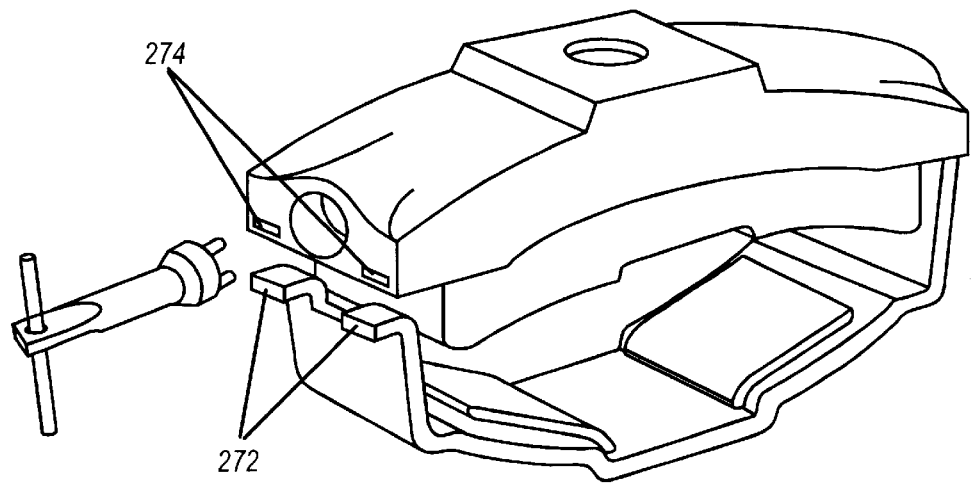
FIG. 39 is a perspective view of an alternative tightening and resilient buffering member configuration.

Referring to FIG. 39, a perspective view of an alternative tightening configuration is illustrated. As shown, the upper body member 12 and the lower body member 14 are connected at one distal end via one or more tabs 272 and with respective apertures 274, where the tabs 272 fit into the apertures 274. The other distal end of the securement arrangement is connected in a similar manner or any suitable manner known to one skilled in the art. To insert the tabs 272 into the apertures 274, the distal end of the lower body member 14 having the tabs is flexible enough to allow the distal end to flex inward and resilient enough to allow the distal end to flex outward thus allowing the apertures 274 to receive the tabs 272.

To tighten the upper body member 12 to the lower body member 14, a threaded fastener 276 is used to increase or lower compression between fitting members 18 within cavities within the upper body member 12 and lower body member 14. In a preferred embodiment, the fastener is a screw having one or more slots within the head of screw for receiving one or more projections 280, respectively, from a key 280. A nut 284 within either the upper body portion 12 or lower body portion 14 is configured to receive the threaded fastener 276. One or more guides 286 are used to guide the threaded fastener 276.

Figure 40:
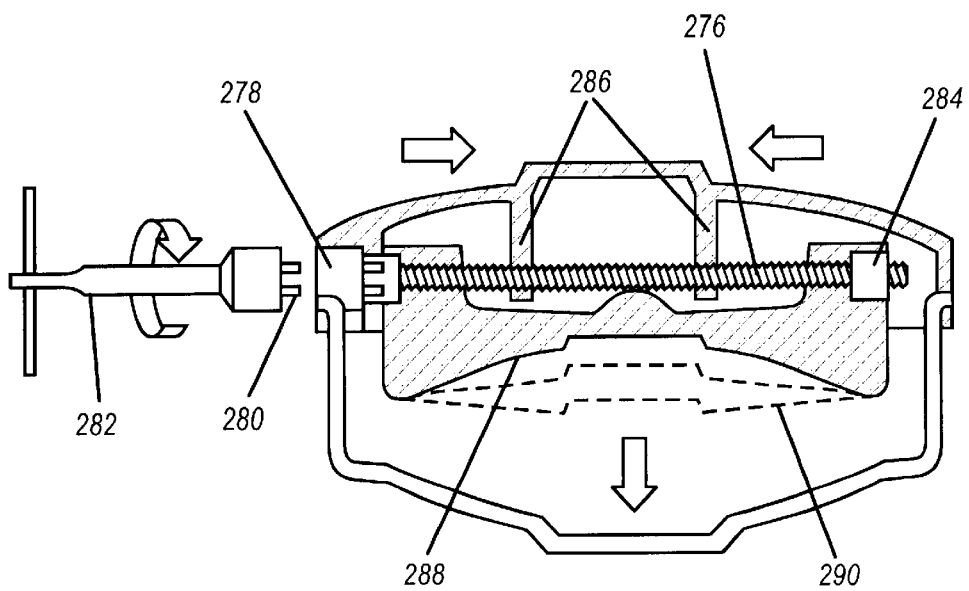
FIG. 40 is a cross sectional view of the configuration of FIG. 39.

Referring to FIG. 40, a cross sectional view of the tightening configuration of FIG. 39 is illustrated. As shown, the fitting member 18 of the lower body member 14 is in a compressed state 288 or an expanded state 290 depending on the position of the fastener 276.

Figure 41:
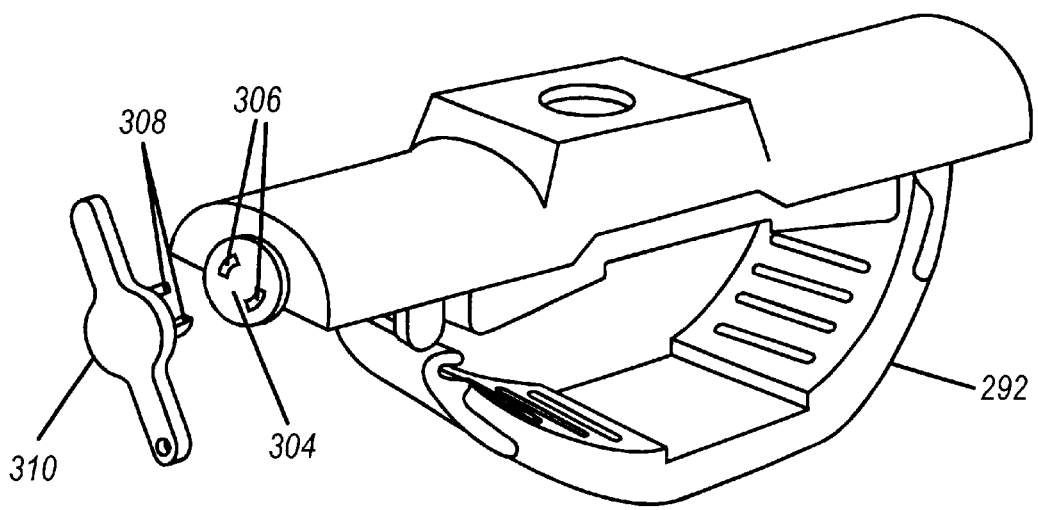
FIG. 41 is a perspective view of an alternative tightening and buffering configuration.

Referring to FIG. 41, a perspective view of an alternative tightening configuration is illustrated. As shown, the lower body portion 14 is a flexible base strap 292. The flexible base strap 292 includes a threaded end 294 configured to be attached to a threaded fastener 302 at a distal end of the strap 292 and a rod receiving end 296 configured to receive a rod 298 fixedly attached to a nut 300 at the other distal end of the strap 292. The nut 300 is rotatingly attached to the fastener 296 at one distal end of the threaded fastener 296.

The upper body member 12 includes the threaded fastener 302 which is threaded in at least two locations, at about the nut 300 and at about the threaded strap end 294 of the lower body member 14. The fastener 302 further includes a head 304 having one or more slots 306 configured to receive one or more projections 308, respectively, from a key 310. The key 310 is used to tighten and loosen the securement arrangement 10. The upper body member 12 further include one or more guides 312 are used to guide the threaded fastener 296.

Figure 42:
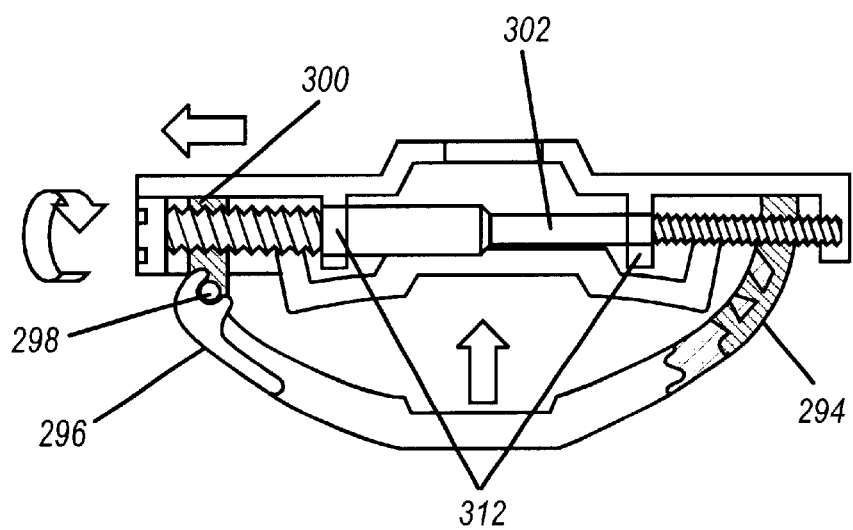
FIG. 42 is a cross sectional view of the configuration of FIG. 41.

Referring to FIG. 42, a cross sectional view of the tightening configuration of FIG. 41 is illustrated. As shown, the threads of the threaded fastener 302 have thread patterns which are reverse to one another, thus allowing the flexible base strap to have both distal ends move inward or outward depending on the rotation of the fastener 302.

Figure 43:
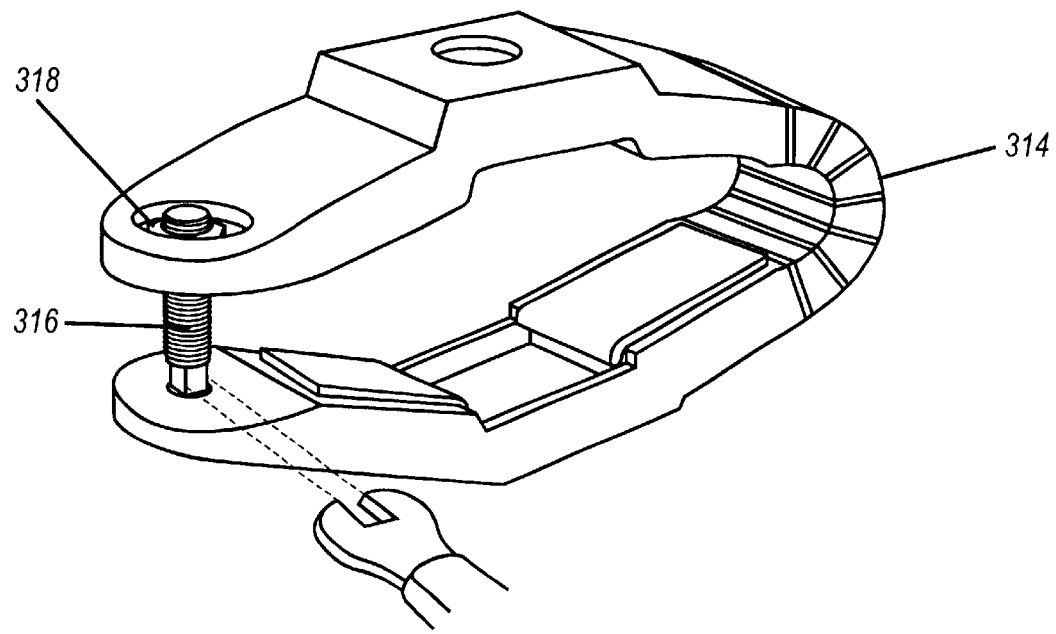
FIG. 43 is a perspective view of an alternative tightening configuration and flex-hinge.
Figure 44:
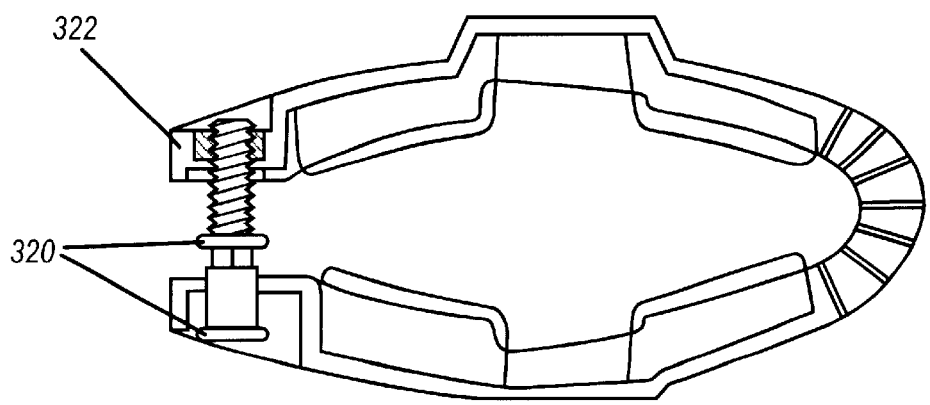
FIG. 44 is a cross sectional view of the configuration of FIG. 43.

Referring to FIGS. 43, and 44 a perspective view of an alternative tightening configuration and a cross sectional view of the tightening configuration are illustrated. As shown, the upper body member 12 is connected to the lower body member 14 via a flexible end 314 at the same distal ends of the members 12, 14. At the other distal end, a threaded bolt 316 and a captured nut 318 connect the upper body member 12 to the lower body member 14. Specifically, the threaded bolt 316 includes at least one flange 320 to prevent the bolt 316 from being removed from the lower body member 14. The upper body member 12 includes the nut 318 within a nut recess 322 with the nut 318 being configured to receive the threaded bolt 316. The threaded bolt 316 includes a square section 324. A key 326, e.g., a wrench, interacts with the square section 324 thereby allowing the tightening and loosening of the non flexible end of the securement arrangement.

A load carrier securement arrangement and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A securement arrangement for mounting articles upon a carrying vehicle, said arrangement comprising:

a substantially rigid body member, said body member having a receiver configured to accept the installation of a fitting member therein; and a resilient fitting member adapted to be installed in said receiver in a plurality of orientations, said fitting member being configured to present a variable buffering thickness between said rigid body member and a receiving member of a carrying vehicle upon which said securement arrangement shall be installed, said variable buffering thickness being dependent upon an installed orientation of said fitting member in said receiver.

2. A securement arrangement for mounting articles upon a carrying vehicle, said arrangement comprising:

a pair of substantially rigid body members, at least one of said pair of body members having a receiver configured to accept the installation of a fitting member therein; and a resilient fitting member adapted to be installed in said receiver in a plurality of orientations, said fitting member being configured to present a variable buffering thickness between said rigid body member and a receiving member of a carrying vehicle upon which said securement arrangement shall be installed, said variable buffering thickness being dependent upon an installed orientation of said fitting member in said receiver.

3. The securement arrangement as recited in claim 2, said arrangement further comprising:

a plurality of resilient fitting members, each fitting member being adapted to be installed in said receiver in a plurality of orientations, at least one of said fitting members being configured to present a variable buffering thickness between said rigid body member and a receiving member of a carrying vehicle upon which said securement arrangement shall be installed, said variable buffering thickness being dependent upon an installed orientation of said fitting member in said receiver.

4. The securement arrangement as recited in claim 3, said arrangement further comprising:

at least one of said plurality of resilient fitting members having an adapted surface on at least one side thereof, said adapted surface configured to cause a reduced buffering thickness to be established between said rigid body member and a receiving member of a carrying vehicle upon which said securement arrangement shall be installed based on the orientation of said adapted surface when said fitting member is installed in said rigid body member.

5. The securement arrangement as recited in claim 3, said arrangement further comprising:

at least one of said plurality of resilient fitting members having a recess in at least one side thereof, said recess configured to cause a reduced buffering thickness to be established between said rigid body member and a receiving member of a carrying vehicle upon which said securement arrangement shall be installed when said fitting member is installed with said recess toward said rigid body member.

6. The securement arrangement as recited in claim 2, said arrangement further comprising:

said pair of substantially rigid body members being coupled together at a hinge connection configured to permit relative pivotal movement between the two body members of the pair.

* * * * *